US006420072B1

(12) United States Patent
Maruyama et al.

(10) Patent No.: US 6,420,072 B1
(45) Date of Patent: Jul. 16, 2002

(54) POLYELECTROLYTIC GEL

(75) Inventors: Kunio Maruyama; Koji Tanaka, both of Okayama; Shiro Hamamoto, Otsu, all of (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/572,179

(22) Filed: May 17, 2000

(30) Foreign Application Priority Data

May 20, 1999 (JP) .......................................... 11-140597

(51) Int. Cl.$^7$ ................................................ H01M 6/14
(52) U.S. Cl. ........................ 429/303; 429/314; 429/322; 429/309; 252/62.2
(58) Field of Search ............................. 429/303, 314, 429/322, 309; 252/62.2

(56) References Cited

U.S. PATENT DOCUMENTS 5,463,490 A 10/1995 Seto

FOREIGN PATENT DOCUMENTS

| JP | 9-278840 A | * | 10/1997 |
| JP | 11-102613 A | * | 4/1999 |
| JP | 2000-11757 A | * | 1/2000 |

OTHER PUBLICATIONS

Patent Abstracts of Japan, vol. 1998, No. 14 (Dec. 31, 1998) (JP 10 241460 A ( Sep. 11, 1998)).
Database WPI, Section Ch, Week 197711, Derwent Publications Ltd., London, GB Class A85, AN 1977–19113Y (XP002146277) (JP 52 014831 A (Feb. 4, 1977)).
Patent Abstracts of Japan, vol. 1999, No. 08, (Jun. 30, 1999) (JP 11 080416 A ( Mar. 26, 1999)).
Mamytbekov, G. et al. "Phase transition in swollen gels 26. Effect of charge concentration on temperature dependence of swelling and mechanical behavior of poly (N–vinylcaprolactam) gels" Eur. Polym. J. (1999), 35 (11) pp. 1925–1933.*

* cited by examiner

Primary Examiner—Laura Weiner
(74) Attorney, Agent, or Firm—Leydig, Voit & Mayer, Ltd.

(57) ABSTRACT

This invention includes a polyelectrolytic gel comprising a polymer component and a nonaqueous solvent, characterized in that the polymer component is a crosslinked polymer having nitrogen-containing cationic functional group or a mixture of a non-crosslinked polymer having nitrogen-containing cationic functional group and a crosslinked polymer free of nitrogen-containing cationic functional group, the polymer component being swollen with the nonaqueous solvent containing an electrolyte dissolved therein. The electrolytic gel of the invention is excellent in heat resistance and durability and also in electroconductivity, especially ion conductivity.

31 Claims, No Drawings

POLYELECTROLYTIC GEL

The present invention relates to a novel polyelectrolytic gel.

In secondary lithium batteries, condensers, capacitors, sensors or like devices using an electrolyte, the electrolyte should be tightly enclosed therein to prevent a liquid leakage or a fire due to short circuits, and it should be firmly encased therein to avoid an accident due to an impact. In view of this necessity, lightweight devices have been difficult to produce. For overcoming this drawback, it is desired to solidify an electrolyte.

For solidification of electrolytes, solid electrolytes and polyelectrolytic gels have been proposed which are applicable to electrochemical devices such as secondary batteries, condensers, capacitors, sensors or the like. For example, the proposals include solid electrolytes which comprise a mixture of an electroconductive powder with polyacrylonitrile or an acrylonitrile/methyl (meth)acrylate non-crosslinked copolymer (Electrochimica. Act., Vol.37, No.10, 1851–1854, 1992, JP-A-4-306560 and JP-A-7-45271); and polyelectrolytic gels produced by using a crosslinked polymer formed from polyethylene glycol diacrylate, polyethylene glycol dimethacrylate or the like (JP-A-62-285954 and JP-A-6-68906).

However, these solid electrolytes and electrolytic gels have drawbacks that they are low in heat resistance and that when heated to 60° C. or higher, the gel becomes structurally collapsed and unsuitable for use at a high temperature.

For improvement of heat resistance, JP-A-10-144137 proposed a polyelectrolytic gel prepared by cooling a polymer solution to a low temperature below 0° C., e.g. −20° C. to cause gelation, the polymer solution containing a non-crosslinked copolymer of acrylonitrile and methyl (meth)acrylate or vinyl acetate dissolved in a nonaqueous solvent containing an electrolyte. However, the obtained gel is instable in electroconductivity, particularly ion conductivity. When the gel is used for secondary lithium-ion batteries or electrolytic condensers, the devices not only become instable in ion conductivity immediately after production, but also increase the resistance due to repeated charge and discharge, resulting in rapid reduction of ion conductivity.

Since acrylonitrile polymers or the like used for conventional electrolytic gels or solid electrolytes are mostly produced by copolymerizing monomers having carboxyl group or sulfonic acid group, the gels and solids are likely to contain a large amount of alkali metal cations or alkaline earth metal cations or anions of sulfuric acid, nitric acid or like acids as counter ions.

For example, when an electrolytic gel using an acrylonitrile polymer contains 500 ppm or more of alkali metal ions or alkaline earth metal ions other than lithium ions, lithium ions are low in mobility, i.e. ion conductivity and also become lower in ion conductivity by repeated charge and discharge, so that the resulting secondary lithium-ion battery is given a short service life and is unsuitable for use.

Stated more specifically, cations or anions larger in ionic radius than lithium ions not only reduce the mobility of lithium ions in the polyelectrolytic gel but also degrade the properties of electrode materials and electrolytes by repeated charge and discharge, thereby gradually lowering the electroconductivity and shortening the service life of batteries or condensers.

It is an object of the present invention to provide a novel polyelectrolytic gel which is excellent in heat resistance and durability and is superior in electroconductivity, particularly ion conductivity.

Other objects and features of the present invention will become more apparent from the following description.

The present inventor conducted extensive research and found that the foregoing object can be achieved by a polyelectrolytic gel wherein a polymer component is swollen with a nonaqueous solvent containing an electrolyte dissolved therein, the polymer component having nitrogen-containing cationic functional group and possessing a crosslinking structure. The present invention was completed based on this novel finding.

According to the present invention, there are provided the following polyelectrolytic gels.

1. A polyelectrolytic gel comprising a polymer component and a nonaqueous solvent, characterized in that the polymer component is a crosslinked polymer having nitrogen-containing cationic functional group or a mixture of a non-crosslinked polymer having nitrogen-containing cationic functional group and a crosslinked polymer free of nitrogen-containing cationic functional group, the polymer component being swollen with the nonaqueous solvent containing an electrolyte dissolved therein.

2. The polyelectrolytic gel according to item 1, wherein the nitrogen-containing cationic functional group is at least one species selected from the class consisting of free primary amino group, secondary amino group or tertiary amino group, primary ammonium base, secondary ammonium base, tertiary ammonium base or quaternary ammonium base which ammonium bases have formed a salt with carboxy anion, and quaternary ammonium base having formed a salt with hydroxy anion.

3. The polyelectrolytic gel according to item 1, wherein the polymer component is a crosslinked polymer having nitrogen-containing cationic functional group.

4. The polyelectrolytic gel according to item 3, wherein the crosslinked polymer having nitrogen-containing cationic functional group is obtained by polymerizing and crosslinking 100 parts by weight of an unsaturated monomer free of nitrogen-containing cationic functional group, 1 to 100 parts by weight of an unsaturated monomer having nitrogen-containing cationic functional group and 1 to 50 parts by weight of a crosslinkable monomer having at least two reactive functional groups per molecule.

5. The polyelectrolytic gel according to item 4, wherein the unsaturated monomer free of nitrogen-containing cationic functional group is acrylonitrile.

6. The polyelectrolytic gel according to item 4, wherein the crosslinkable monomer has at least two reactive functional groups selected from the class consisting of hydroxyl, carboxyl, glycidyl, vinyl, isocyanate and methylol.

7. The polyelectrolytic gel according to item 3, wherein the crosslinked polymer having nitrogen-containing cationic functional group is obtained by polymerizing 100 parts by weight of an unsaturated monomer free of nitrogen-containing cationic functional group and 1 to 100 parts by weight of an unsaturated monomer having nitrogen-containing cationic functional group to give a non-crosslinked polymer, and crosslinking the resulting non-crosslinked polymer with 1 to 200 parts by weight of a crosslinking agent.

8. The polyelectrolytic gel according to item 7, wherein the non-crosslinked polymer has at least one species of reactive functional group selected from the class consisting of hydroxyl, carboxyl, glycidyl, vinyl, isocyanate and methylol, and wherein the crosslinking agent is a compound having at least one species of reactive functional group selected from the class consisting of hydroxyl, carboxyl, glycidyl, vinyl, isocyanate and methylol, the functional group of the crosslinking agent being complementarily reactive to the reactive functional group of the non-crosslinked polymer and being at least two in number per molecule.

9. The polyelectrolytic gel according to item 7, wherein the unsaturated monomer free of nitrogen-containing cationic functional group comprises acrylonitrile and the unsaturated monomer having at least one species of reactive functional group selected from the class consisting of hydroxyl, carboxyl, glycidyl and methylol.

10. The polyelectrolytic gel according to item 1, wherein the polymer component is a mixture of a non-crosslinked polymer having nitrogen-containing cationic functional group and a crosslinked polymer free of nitrogen-containing cationic functional group.

11. The polyelectrolytic gel according to item 10, wherein the non-crosslinked polymer having nitrogen-containing cationic functional group is obtained by polymerizing 100 parts by weight of an unsaturated monomer free of nitrogen-containing cationic functional group and 1 to 100 parts by weight of an unsaturated monomer having nitrogen-containing cationic functional group.

12. The polyelectrolytic gel according to item 11, wherein the unsaturated monomer free of nitrogen-containing cationic functional group is acrylonitrile.

13. The polyelectrolytic gel according to item 10, wherein the mixture of a non-crosslinked polymer having nitrogen-containing cationic functional group and a crosslinked polymer free of nitrogen-containing cationic functional group is obtained by polymerizing and crosslinking 10 to 200 parts by weight of a polymerizable compound having at least two crosslinkable functional groups per molecule in the presence of 100 parts by weight of a non-crosslinked polymer having nitrogen-containing cationic functional group.

14. The polyelectrolytic gel according to item 13, wherein the polymerizable compound is a compound having at least two crosslinkable functional groups per molecule, the crosslinkable functional groups being at least one species selected from the class consisting of vinyl, glycidyl, isocyanate, hydroxyl and methylol.

15. The polyelectrolytic gel according to item 1, wherein the cation species of the electrolyte in the gel is lithium ion and the total amount of alkali metal ions other than lithium ions and alkaline earth metal ions is 500 ppm or less based on the polymer component.

16. The polyelectrolytic gel according to item 1, wherein the electrolyte is at least one species selected from the class consisting of $LiClO_4$, $LiBF_4$, $LiPF_6$, $LiAsF_6$, $LiSCN$, $LiI$, $LiBr$, $Li_2B_{10}Cl_{10}$, $CF_3SO_3Li$ and $LiC(SO_2CF_3)_3$.

17. The polyelectrolytic gel according to item 1, wherein the amount of the nonaqueous solvent is 100 to 5,000 parts by weight per 100 parts by weight of the polymer component.

18. The polyelectrolytic gel according to item 1, wherein the nonaqueous solvent is an aprotic solvent.

19. The polyelectrolytic gel according to item 18, wherein the nonaqueous solvent has a boiling point of 90° C. or higher.

20. The polyelectrolytic gel according to item 1, wherein when heated to 80° C., the gel is neither dissolved nor brings about a phase separation into liquid phase and solid phase.

21. The polyelectrolytic gel according to item 1, wherein the gel is in the form of a membrane having a thickness of 1 to 500 μm.

The polyelectrolytic gel of the present invention is resistant to heat at 80° C. or higher, non-degradable in properties by repeated charge and discharge, namely highly durable and is excellent in electroconductivity, particularly in ion conductivity.

The polyelectrolytic gel of the present invention comprises a polymer component and a nonaqueous solvent, the polymer component having nitrogen-containing cationic functional group and being swollen by absorbing a large amount of the nonaqueous solvent containing an electrolyte dissolved therein, and the polymer component possessing a crosslinked structure which is a three-dimensionally reticulated structure insoluble in the nonaqueous solvent. The amounts of the polymer component and the nonaqueous solvent to be used are about 100 to about 5,000 parts by weight of the latter per 100 parts by weight of the former. The electrolyte exists as dissolved in the nonaqueous solvent.

The polymer component in the gel of the present invention essentially has nitrogen-containing cationic functional group. The nitrogen-containing cationic functional group is a nitrogen-containing substituent which can become a cation or has become a cation, on reaction with an acid.

Examples of the nitrogen-containing cationic functional group are free amino group, ammonium bases having formed a salt with carboxy anion, ammonium base having formed a salt with hydroxy anion, etc. The nitrogen atom of the nitrogen-containing cationic functional group may be one constituting the nitrogen-containing heterocycle.

The polyelectrolytic gel using the polymer component containing such nitrogen-containing cationic functional group has a polarizing current value higher by 5 times than conventional polyelectrolytic gels,.as measured by cyclic voltammetry.

This feature is presumably derived from the following. For example, anions such as $BF_4^-$, $PF_6^-$, $AsF_6^-$, $I^-$, $Br^-$, $ClO_4^-$, $SCN^-$, $CF_3SO_3^-$, $C(SO_2CF_3)_3^-$ or the like larger in radius than lithium ions are present as counter ions in a lithium compound often used as an electrolyte, and are scavenged by the nitrogen-containing cationic functional group in the polymer component, whereby the mobility, namely transport number, of lithium ions is enhanced.

When the nitrogen-containing cationic functional group has formed a salt with a strong acid such as hydrochloric acid, nitric acid, sulfuric acid, phosphoric acid, sulfonic acid or the like, the ability of increasing the transport number of lithium ions is lowered, and the ion conductivity of the polyelectrolytic gel is increased in a reduced degree but is higher than conventional gels free of said functional group. The reason for this effect remains to be clarified but it is presumably because there may exist a hollow space in the gel wherein the lithium ions can move relatively easily due to the presence of bulky, large side chain bonded to the polymer molecule.

When the nitrogen-containing cationic functional group in the polymer has formed a salt with a carboxylic acid compound, the obtained gel shows a slightly lower ion conductivity than when a free type is used but a higher ion conductivity than an electrolytic gel using a polymer free of said functional group.

Since the electrolyte dissolved in the nonaqueous solvent is usually a strong acid salt, the anion of the carboxylic acid compound having formed a salt with the cationic functional group is replaced with the anion of the electrolyte, so that the lithium ions can become easily movable and the ion conductivity is presumably unhindered.

Consequently preferred nitrogen-containing cationic functional groups for use herein include free primary amino group, free secondary amino group, free tertiary amino group, primary ammonium base having carboxy anion as a counter anion, secondary ammonium base having carboxy anion as a counter anion, tertiary ammonium base having carboxy anion as a counter anion, quaternary ammonium base having carboxy anion as a counter anion, and quaternary ammonium base having hydroxy anion as a counter anion.

The nitrogen-containing cationic functional group need not be a free amino group or ammonium base having carboxy anion or hydroxy anion as a counter anion in the preparation of the polyelectrolytic gel of the present invention. For example, if the nitrogen-containing cationic functional group of the unsaturated monomer is free and instable and it is difficult to polymerize the monomer in this state, the polymer obtained by polymerization of the monomer having formed a salt with an acid can be converted to a polymer having free amino group or ammonium base having said counter anion by washing with a solution of lithium hydroxide, sodium hydroxide, potassium hydroxide or the like or by using an anion exchange resin.

It is essential in the present invention that the polymer component constituting the gel of the invention have a crosslinked structure to retain the form of the gel. Accordingly the polymer component should be a crosslinked polymer having nitrogen-containing cationic functional group or a mixture of a non-crosslinked polymer having nitrogen-containing cationic functional group and a crosslinked polymer free of cationic functional group.

For ease of production and quality of product, the crosslinked polymer having nitrogen-containing cationic functional group is preferably prepared by polymerizing an unsaturated monomer having nitrogen-containing cationic functional group and crosslinking the obtained polymer compound.

Preferred crosslinked polymers having nitrogen-containing cationic functional group include, stated more specifically:

(i) a polymer prepared by polymerizing and crosslinking 100 parts by weight of an unsaturated monomer free of nitrogen-containing cationic functional group, 1 to 100 parts by weight of an unsaturated monomer having nitrogen-containing cationic functional group, and 1 to 50 parts by weight of a crosslinkable monomer having at least 2 reactive functional groups per molecule; and (ii) a polymer prepared by polymerizing.100 parts by weight of an unsaturated monomer free of nitrogen-containing cationic functional group and I to 100 parts by weight of an unsaturated monomer having nitrogen-containing cationic functional group to give a non-crosslinked polymer, and crosslinking the resulting non-crosslinked polymer with 1 to 200 parts by weight of a crosslinking agent having at least 2 reactive functional groups per molecule.

Other crosslinked polymers having nitrogen-containing cationic functional group include:

(iii) a polymer obtained by crosslinking a polymer compound free of nitrogen-containing cationic functional group with a crosslinking agent having nitrogen-containing cationic functional group. Examples of such crosslinked polymer include a crosslinked polymer prepared by crosslinking with a polyamine compound a polymer compound free of nitrogen-containing cationic functional group and having an epoxy group.

The unsaturated monomer having nitrogen-containing cationic functional group is one having functional groups such as primary amino group, secondary amino group, tertiary amino group, primary ammonium base, secondary ammonium base, tertiary ammonium base, quaternary ammonium base, nitrogen-containing heterocyclic residue, residue of heterocyclic salt which has become a cation or the like. Among them, preferred are primary to tertiary amine compounds having free (without forming a salt with an acid) primary to tertiary amino groups and primary to quaternary ammonium compounds having carboxy anion as a counter anion, and quaternary ammonium compounds having hydroxy anion as a counter anion.

The number of nitrogen-containing cationic functional groups in the unsaturated monomer having nitrogen-containing cationic functional group is not limited to one group per molecule, and may be more than one. The kind of nitrogen-containing cationic functional group is not limited to one species but may be a mixture of primary to quaternary functional groups.

Preferred examples of monomers having a single nitrogen-containing cationic functional group are allylamine, methallylamine, N-ethylamino acrylate, N-propylamino methacrylate, N-methylaminoethyl acrylate, N-diethylaminoethyl acrylate, N-diethylaminoethyl methacrylate, N-dimethylaminopropyl acrylamide, N-diethylaminoethyl methacrylamide, N-trimethylaminoethyl acrylate, N-triethylaminoethyl methacrylate, etc.

Preferred examples of monomers having two or more nitrogen-containing cationic functional groups are a composite of primary amine and secondary amine such as aminoethyl methallylamine, a composite of secondary amine and tertiary amine such as N-dimethylaminopropyl allylamine, (N-diethylaminoethyl)-N'-ethylaminoethyl methacrylate and the like.

Examples of unsaturated monomers free of nitrogen-containing cationic functional group are not limited insofar as they are copolymerizable with an unsaturated monomer having nitrogen-containing cationic functional group, and include acrylonitrile, methacrylonitrile, vinyl compounds, acrylate compounds, etc. Among them, acrylonitrile is preferred.

Examples of vinyl compounds are vinyl acetate, vinyl propionate, vinyl butyrate, styrene, vinyl pyridine, N-vinyl pyrrolidone, etc. Examples of acrylate compounds are methyl acrylate, ethyl acrylate, propyl acrylate, butyl acrylate, methyl methacrylate, ethyl methacrylate, propyl methacrylate, butyl methacrylate and like alkyl esters of (meth)acrylic acid; hydroxymethyl acrylate, hydroxyethyl acrylate, hydroxypropyl acrylate, hydroxybutyl acrylate and like hydroxyalkyl esters of (meth)acrylic acid; diethylene glycol acrylate, diethylene glycol methacrylate, triethylene glycol acrylate, triethylene glycol methacrylate, polyethylene glycol acrylate, polyethylene glycol methacrylate, polypropylene glycol acrylate, polypropylene glycol methacrylate and like compounds optionally having a terminal hydroxyl group substituted with alkyl to convert to methoxy, ethoxy, buthoxy or like group.

Among the unsaturated monomers free of nitrogen-containing cationic functional group, it is preferred to use reactive monomers containing hydroxyl, carboxyl, isocyanate, methylol, glycidyl or the like to give reactivity with crosslinkable monomers or crosslinking agents.

Examples of such reactive monomers are allyl alcohol, methallyl alcohol, N-methylol acrylamide, N-methylol methacrylamide, hydroxyethyl acrylate, hydroxyethyl methacrylate, hydroxypropyl methacrylate, methylenebis acrylamide, methylenebis methacrylamide, glycerol monomethacrylate, acrylic acid, methacrylic acid, itaconic acid, maleic acid, glycidyl acrylate, glycidyl methacrylate, etc.

The amount of the unsaturated monomer having nitrogen-containing cationic functional group is usually 1 to 100 parts by weight, preferably 5 to 100 parts by weight, more preferably 10 to 100 parts by weight, per 100 parts by weight of the unsaturated monomer free of nitrogen-containing cationic functional group. Less than 1 part of the unsaturated monomer having nitrogen-containing cationic functional group results in less effect of increasing the transport number of lithium ions, whereas more than 100 parts by weight thereof can not achieve a higher effect.

The crosslinkable monomer having at least two reactive functional groups per molecule is used simultaneously with the unsaturated monomer having nitrogen-containing cationic functional group and the unsaturated monomer free of nitrogen-containing cationic functional group to undergo polymerization and crosslinking reactions in a single step for the purpose of introducing a crosslinked structure for increase of heat resistance of polyelectrolytic gel, giving a crosslinked polymer having nitrogen-containing cationic functional group.

On the other hand, the crosslinking agent containing at least two reactive functional groups per molecule is used as follows. The unsaturated monomer having nitrogen-containing cationic functional group and the unsaturated monomer free of nitrogen-containing cationic functional group are polymerized to give a non-crosslinked polymer having nitrogen-containing cationic functional group, and the crosslinking agent is added to the obtained non-crosslinked polymer to crosslink the same. In other words, the crosslinking agent is used in producing the crosslinked polymer having nitrogen-containing cationic functional group by a two-step process.

When the gel is prepared by the single step, the amount of such crosslinkable monomer is 1 to 50 parts by weight, preferably 2 to 40 parts by weight, per 100 parts by weight of the unsaturated monomer free of nitrogen-containing cationic functional group and per 1 to 100 parts by weight of the unsaturated monomer having nitrogen-containing cationic functional group. Less than 1 part of the crosslinkable monomer or crosslinking agent lessens the degree of crosslinking, making it difficult to solidify the gel, and gives a low heat resistance to the gel. Hence it is undesirable. On the other hand, more than 50 parts by weight of the crosslinkable monomer or crosslinking agent excessively increases the degree of crosslinking, giving a hard and brittle polymer and a gel which is likely to develop cracks. Namely it results in production of a polymer unsuitable for use and is undesirable.

When the gel is prepared by the two-step process, the amount of such crosslinking agent is 1 to 200 parts by weight per 100 parts by weight of the unsaturated monomer free of nitrogen-containing cationic functional group and per 1 to 100 parts by weight of the unsaturated monomer having nitrogen-containing cationic functional group.

The crosslinkable monomer or crosslinking agent for use in the present invention are compounds having at least two reactive functional groups per molecule.

Examples of compounds having two bonded reactive functional groups such as hydroxyl, carboxyl, glycidyl, vinyl, isocyanate, methylol or the like are ethylene glycol diglycidyl ether, polyethylene glycol diglycidyl ether, ethylene glycol diacrylate, polyethylene glycol diacrylate, ethylene glycol dimethacrylate, polyethylene glycol dimethacrylate, divinylbenzene, polyethylene glycol diisocyanate, 1,4-butanediol diacrylate, 1,4-butanediol dimethacrylate, 1,6-hexanediol diacrylate, 1,6-hexanediol dimethacrylate, 1,9-nonanediol diacrylate, 1,9-nonanediol dimethacrylate, glycidyl acrylate, glycidyl methacrylate, N-methylol acrylamide, N-methylol methacrylamide, hydroxyethyl methacrylate, methylenebis acrylamide, methylenebis methacrylamide, 1,4-butanediol, 1,6-hexanediol, 1,9-nonanediol, polyethylene glycol, polypropylene glycol, tetramethylene glycol, adipic acid, sebacic acid, dimer acid, etc.

Examples of compounds having three bonded reactive functional groups are trimethylolpropane triacrylate, trimethylolpropane trimethacrylate, pentaerythritol triacrylate, trimethylpropane triglycidyl ether, trimethylolpropane, citric acid, etc.

Examples of compounds having four or more bonded reactive functional groups are pentaerythritol tetraacrylate, dipentaerythritol hexaacrylate, pentaerythritol, etc.

When the crosslinked polymer having nitrogen-containing cationic functional group is prepared by separately carrying out polymerizing and crosslinking reactions in two steps, the non-crosslinked polymer has at least one species of reactive functional group selected from the class consisting of hydroxyl, carboxyl, glycidyl, vinyl, isocyanate and methylol, and the crosslinking agent is preferably a compound having at least one species of reactive functional group selected from the class consisting of hydroxyl, carboxyl, glycidyl, vinyl, isocyanate and methylol, the functional group of the agent being at least two in number per molecule and being complementarily reactive to the reactive functional group of the non-crosslinked polymer.

The polymer component constituting the gel of the present invention may be a mixture of a non-crosslinked polymer having nitrogen-containing cationic functional group and a crosslinked polymer free of nitrogen-containing cationic functional group.

When the polymer component is said mixture, a preferred polymer component is obtained by polymerizing and crosslinking 10 to 200 parts by weight of a polymerizable compound having at least 2 crosslinkable functional groups per molecule in the presence of 100 parts by weight of a non-crosslinked polymer having nitrogen-containing cationic functional group.

The non-crosslinked polymer having nitrogen-containing cationic functional group is a homopolymer of an unsaturated monomer having nitrogen-containing cationic functional group or a copolymer of said unsaturated monomer and the unsaturated monomer free of nitrogen-containing dationic functional group. A preferred non-crosslinked polymer is one obtainable by polymerizing 100 parts by weight of an unsaturated monomer free of nitrogen-containing cationic functional group and 1 to 100 parts by weight of an unsaturated monomer having nitrogen-containing cationic functional group. The foregoing non-crosslinked polymer has a weight average molecular weight of preferably about 5,000 to about 1 million, more preferably about 10,000 to about 500,000. When the molecular weight is less than 5,000, the gel may be too soft to retain the form at a high temperature. In the case of more than 1 million, the solution is given too high a viscosity in production, becoming difficult to handle. Hence the molecular weight outside said range is undesirable.

Desirable as said polymerizable compound having at least two crosslinkable functional groups per molecule is said crosslinkable monomer having at least two functional groups per molecule. The crosslinkable monomers may be used either alone or in combination with a monomer which is copolymerizable therewith and is free of nitrogen-containing cationic functional group.

When 10 to 200 parts by weight of the polymerizable compound having at least 2 crosslinkable functional groups per molecule is polymerized and crosslinked in the presence of 100 parts by weight of the non-crosslinked polymer having nitrogen-containing cationic functional group, there is obtained a mixture of a non-crosslinked polymer having nitrogen-containing cationic functional group and a crosslinked polymer free of cationic functional group which is a polymer or copolymer of the polymerizable compound. The mixture presumably comprises the non-crosslinked polymer and the crosslinked polymer as tangled with each other at a molecule order without being chemically bonded. When the amount of the polymerizable compound is less than 10 parts by weight per 100 parts by weight of the non-crosslinked polymer, the mixture is difficult to gel sufficiently, whereas more than 200 parts by weight forms a highly crosslinked structure, giving a gel with low flexibility and making it difficult to obtain a gel suitable for use. Hence it is undesirable.

In preparing the polyelectrolytic gel of the invention, it is possible to add, when so required, other polymer compound in addition to the polymer component comprising a crosslinked polymer having nitrogen-containing cationic functional group or a mixture of a non-crosslinked polymer having nitrogen-containing cationic functional group and a crosslinked polymer free of nitrogen-containing cationic functional group. Examples of other polymer compounds are polyethylene oxide, polypropylene oxide, polybutylene oxide and copolymers of these oxides like polyalkylene glycol which has two terminal hydroxyl groups substituted with alkyl groups. Among them, dimethoxypolyethylene glycol with a molecular weight of about 500 to about 3,000 provides a gel with high ion conductivity and superior polarizing current value and is desirable.

Suitable electrolytes in the gel of the invention include, for example, $LiClO_4$, $LiBF_4$, $LiPF_6$, $LiAsF_6$, $LiI$, $LiBr$, $LiSCN$, $Li_2B_{10}Cl_{10}$ and like inorganic lithium compounds and $CF_3SO_3Li$, $LiC(SO_2CF_3)_3$ and like organic lithium compounds. However, useful electrolytes are not limited to these examples insofar as they can be dissolved in the nonaqueous solvent.

The concentration of the electrolyte in the nonaqueous solvent can be determined depending on the kind of electrolytes and the desired level of electroconductivity, but is about 0.1 to about 3 mole/l, preferably about 0.3 to about 2 mole/l.

The nonaqueous solvent dissolving the electrolyte for use herein is not aqueous and is capable of dissolving a non-crosslinked polymer having nitrogen-containing cationic functional group. Preferred solvents are those having a water content of 1% by weight or less. Aprotic solvents are desirable to use.

Recommendable nonaqueous solvents include, for example, ethylene carbonate, propylene carbonate, butylene carbonate, diethyl carbonate, dimethyl carbonate, methylethyl carbonate and like carbonate solvents, ethylene glycol, propylene glycol, methyl cellosolve, ethyl cellosolve and like ether solvents, γ-butyrolactone, sulforan, adiponitrile, glutaronitrile, N-methyl pyrrolidone, trimethyl phosphate, etc.

Preferred solvents are those having a high boiling point, preferably a boiling point of higher than 90° C., insofar as the non-crosslinked polymer having nitrogen-containing cationic functional group has a high solubility. The solvents with a boiling point of lower than 90° C. are readily volatile and are likely to cause problems due to its high vapor pressure. Hence they are undesirable.

These solvents can be used either alone or in combination. For example, to enhance the electrochemical properties at low temperatures, a mixture of two, three or more solvents is preferable to use in view of the viscosity and boiling point of the solvent.

The amount of the nonaqueous solvent in the polyelectrolytic gel is preferably about 100 to about 5,000 parts by weight, more preferably about 500 to about 5,000 parts by weight, per 100 parts by weight of the polymer component.

Less than 100 parts by weight fails to give a gel having high flexibility and excellent processability. On the other hand, more than 5,000 parts by weight gives a soft gel, or leaves a non-solid product or a viscous solution or brings about a phase separation into solid gel and nonaqueous solvent, resulting in difficulty in achieving the contemplated object.

The polyelectrolytic gel of the invention can be suitably prepared as by the following processes.

(1) A process to be conducted comprises the steps of dissolving an unsaturated monomer having nitrogen-containing cationic functional group, an unsaturated monomer free of nitrogen-containing cationic functional group, a crosslinkable monomer and an electrolyte in a nonaqueous solvent, and heating the solution or irradiating the solution with an activation energy rays such as ultraviolet rays, electron rays or the like to conduct polymerization and crosslinking, giving a polyelectrolytic gel.

(2) A non-crosslinked polymer is prepared by polymerizing an unsaturated monomer having nitrogen-containing cationic functional group and optionally an unsaturated monomer free of nitrogen-containing cationic functional group. A process to be carried out comprises the steps of dissolving the non-crosslinked polymer, a crosslinking agent and an electrolyte in a nonaqueous solvent, and heating the solution or irradiating the solution with an activation energy rays such as ultraviolet rays, electron rays or the like to crosslink the polymer, giving a polyelectrolytic gel. In this process, optionally the non-crosslinked polymer having nitrogen-containing cationic functional group can be used in combination with a non-crosslinked polymer free of nitrogen-containing cationic functional group.

(3) A process to be performed comprises the steps of dissolving the non-crosslinked polymer prepared in the same manner as in the process (2), a polymerizable compound having crosslinkable functional groups and an electrolyte in a nonaqueous solvent, heating the solution or irradiating the solution with an activation energy rays such as ultraviolet rays, electron rays or the like to polymerize and crosslink the polymerizable compound, giving a polyelectrolytic gel. In this process, optionally the non-crosslinked polymer having nitrogen-containing cationic functional group can be used in combination with a non-crosslinked polymer free of nitrogen-containing cationic functional group. When required, the polymerizable compound having crosslinkable functional groups can be used in combination with other polymerizable compound(s).

(4) A process to be conducted comprises the steps of causing the previously prepared crosslinked polymer having nitrogen-containing cationic functional group to swell with a nonaqueous solvent containing an electrolyte dissolved therein, giving a polyelectrolytic gel.

According to the processes (1) to (3), a gel of crosslinked polymer containing the electrolyte and nonaqueous solvent can be formed from a homogeneous solution of the monomer or polymer with the progress of crosslinking while retaining the homogeneous state. Consequently the processes provides a gel comprising the crosslinked polymer, electrolyte and nonaqueous solvent much more homogeneouly mixed with each other than the process (4) in which the previously prepared crosslinked polymer is caused to swell with the solvent to give a gel. When the gel obtained by the processes (1) to (3) is used for secondary lithium batteries, condensers, capacitors or other electrochemical devices, it is easy to manufacture a stable device of high performance. Accordingly any of the processes (1) to (3) is preferable as a process for preparing the gel of the present invention.

In the case of the process (1), it may be difficult to remove the unreacted monomer from the gel because the polymerization and crosslinking reactions are carried out in a single step. In this case, the gel may contain a large amount of impurities. Especially when the unreacted monomer of low boiling point such as acrylonitrile is left in the gel, the unreacted monomer may generate bubbles due to heat in the gel, making it difficult to produce a gel of high performance. If an attempt is made to remove the unreacted monomer from the gelled polyelectrolyte under reduced pressure, the unreacted monomer may be gasified and bubbles are increased in the gel, probably failing to give a dense gel.

In the case of processes (2) and (3), the non-crosslinked polymer to be used is purified before dissolving the same in the nonaqueous solvent, or after preparation of a polymer in the nonaqueous solvent, a solution of the polymer is usable from which the unreacted monomer of low boiling point has been removed under reduced pressure. The obtained gel contains no or little impurities, and bubbles are unlikely to be generated in the gel. In other words, these processes are recommendable.

In order to overcome the foregoing problem that secondary lithium batteries are instable in ion conductivity, it is desirable in the polyelectrolytic gel of the present invention that the cation species of the electrolyte in the gel be lithium ion and that the total amount of alkali metal ions other than lithium ions and alkaline earth metal ions existing as counter ions of anionic group in the polymer component of the gel be preferably 500 ppm or less, more preferably 100 ppm or less, most preferably 50 ppm or less, based on the polymer component.

To reduce the content of ionic metal impurities, it is important what polymerization catalyst is selected for solution polymerization of the monomer mixture in preparing the gel of the invention, as well as to avoid as much as possible the use of a monomer containing an anionic group having formed a salt with alkali metals other than lithium or alkaline earth metals.

Depending on the kind of polymerization catalysts, the catalyst may be partly taken in the polymer as an ionic terminal group of the polymer. For example, in redox polymerization using sodium sulfite and sodium persulfate, sodium sulfonate derived from the polymerization initiation radical is formed as a polymer terminal group so that a large amount of sodium ions exists in the polymer.

To eliminate the alkali metal ions or alkaline earth metal ions from the polymer, a method of washing with an aqueous solution of strong acid is available, but is not efficient from the viewpoint of commercial manufacture. Consequently such polymerization catalyst should be used in a quantity as small as possible or the use thereof should be avoided to meet the object of reducing the quantity of ionic impurities.

From the above viewpoints, it is recommendable to conduct solution polymerization using a polymerization catalyst free of alkali metals such as benzoyl peroxide, azobisisobutyronitrile, benzyldimethyl ketal or the like or using means such as irradiation with electron rays, UV rays or other rays.

The amount of the polymerization catalyst to be used is varied depending on the kind of catalysts or the desired level of molecular weight and is indeterminable. It is usually in the range of about 0.01 to about 5% by weight based on the total amount of monomers.

The gel of the present invention has a gel structure having intermolecular strong chemical bonds which structure is attributed to the crossliked structure of the polymer component. The gel of the invention is radically different from physical gels free of crosslinked structure. Thus the gel of the invention can be heated without loss of gel form and is excellent in heat stability.

The gel of the invention is stable in the form at a high temperature. For example, when heated even to 80° C. for 1 hour, the gel neither brings about a phase separation into liquid phase of nonaqueous solvent and solid phase of solid gel nor is lowered in transparency. In short, the gel of the invention is outstanding in heat stability.

In secondary batteries or capacitors which require a high output, a laminate of cells is used wherein intermediate cells may be increasingly heated to an unexpectedly high temperature by repeated charge and discharge. To maintain safety, the heat resistance of the gel in individual cells is very important. The gel of the invention can be suitably used for this purpose.

In the above processes, a mixture of monomers can be subjected to solution polymerization in a nonaqueous solvent containing an electrolyte dissolved therein or can be gelled by crosslinking, preferably using means such as irradiation with electron rays, UV rays or heating. Polymerizations available in the above processes include, for example, addition polymerization, ring opening polymerization, condensation polymerization and the like.

The time for polymerization or gelation is widely varied depending on the temperature, polymerization methods, crosslinking methods and other factors. For example, γ-ray irradiation takes less than 1 minute, UV irradiation needs about 1 to about 30 minutes, and heating requires about 10 to about 300 minutes.

When a solution of monomers and other starting materials is charged or poured into a transparent container or a film seal pack, electron ray irradiation and UV irradiation can be efficiently used. In the case of using an opaque container or metal container, heating or the like is utilized. In any case, although a polymerization catalyst is advantageously used for efficient progress of polymerization, a catalyst free of alkali metals other than lithium and alkaline earth metals is suitable to use as described hereinbefore.

The shape of the gel according to the present invention is not limited. Usually the gel can be formed in a shape such as sheets, membranes, spheres, cubes, rectangular parallelepipeds, cylinders, combinations of these shapes, etc. in conducting crosslinking reaction during the production operation. The obtained gel can be given the desired shape by suitable fabrication such as shearing, cutting, crushing or the like.

The gel of the invention to be used as an electrolyte, e.g., for secondary battery cells, is preferably in the shape of a membrane having a thickness of 1 to 500 μm.

The present invention will be described in detail with reference to the following representative Examples and Comparative Examples. However, the present invention is not limited to the Examples. The parts and percentages in the Examples and Comparative Examples are all by weight unless otherwise specified.

The evaluation methods used in the Examples and Comparative Examples are as follows.

Evaluation of Electrochemical Properties

A measurement cell produced from a gel sample was attached to an alternating impedance measurement device (product of Solatorn Co., Ltd., "1286+1250"). The alternating impedance at 100 KHz to 1 Hz at 20° C. was measured, and the impedance values at a measurement frequency of 100 KHz and 100 Hz were taken as a bulk resistance value and an interfacial resistance value, respectively. The ion conductivity was calculated from the bulk resistance value and the thickness and area of the cell.

The measurement of alternating impedance was continued for 24 hours, and then the measurement cell was connected to a device for the evaluation of electrochemical properties (product of Solatorn Co., Ltd., "S1-1280B") to carry out polarization electrolysis by a cyclic voltammetry at a turn over voltage of ±0.5 V and a scan rate of 10 mV/s at 20° C. After three cycles of voltage scanning, a polarizing current value was measured at +0.5 V and the obtained value was taken as a CV polarizing current value.

After the measurement of polarizing current value, an alternating impedance was measured again to give an interfacial resistance value 24 hours after cell assemblage.

From these measured results, a ratio of interfacial resistance value immediately after commencement of measurement to the value 24 hours thereafter was calculated to obtain an increase ratio of interfacial resistance.

The measurement cells of Examples 1 to 34 and Comparative Examples 1 to 4 were assembled as follows. First, a gel membrane having a thickness of about 120 μm was cut to a square shape 2×2 cm. The sample was held at both sides between twin metal lithium foil pieces (0.5 mm in thickness and 2×2 cm) and was placed into a pack of laminated aluminum film lined with a polyethylene film. The pack was connected to a lead wire and was heat-sealed under reduced pressure. A cell was assembled in a globe box with the air replaced with argon gas.

The measurement cells of other Examples are described in each example.

Evaluation of Heat Resistance

A gel sample was placed into a sample bottle and the bottle was heated in a hot-air circulating thermostatic container at 80° C. for 1 hour. Then the bottle was taken out from the container to observe the condition of the gel. The condition of the gel was evaluated and rated according to the following criteria.

A: The gel showed no change of form before and after heating, and was excellent in heat resistance.
B: After heating, the gel was partly dissolved or caused a slight phase separation, and was a little low in heat resistance.
C: After heating, more than 50% of the gel was dissolved or phase-separated and was very low in heat resistance.

The gel samples of Examples 1, 8 to 10, 17 to 34 and Comparative Examples 1 to 3 were prepared as follows. A sample bottle 24 mm in inside diameter and 40 mm in height was charged with 10 ml of a solution containing acrylonitrile, a monomer having nitrogen-containing cationic functional group, a crosslinkable monomer, a nonaqueous solvent containing an electrolyte dissolved therein, a polymerization catalyst and the like. Then the mouth of the bottle was covered with aluminum foil, and the solution was polymerized and crosslinked, giving a gel sample.

The gel samples of Examples 42 to 84 were prepared as follows. A gel membrane 200 μm in thickness was cut to a size 1×2 cm and was introduced into a sample bottle 24 mm in inside diameter and 40 mm in height. The mouth of the bottle was covered with aluminum foil to provide samples.

Evaluation of Flexibility

Gel samples were bent at an angle of 90 degrees at room temperature to observe whether cracks were created at the bent portion. The flexibility was evaluated according to the following criteria.

A: No crack developed, leaving no trace of fold and thus the gel was highly flexible.
B: Although no crack developed, a slight trace of fold was left. The gel was slightly poor in flexibility.
C: Cracks developed and the gel lacked flexibility.

The gel samples of Examples 1 to 41 and Comparative Examples 1 to 4 were prepared as follows. A solution containing acrylonitrile, a monomer having nitrogen-containing cationic functional group, a crosslinkable monomer, a nonaqueous solvent containing an electrolyte dissolved therein, a polymerization catalyst and the like was placed into a seal pack of polyethylene film (100 μm in thickness) having inserted therein a silicone rubber sheet 1 mm in thickness as a spacer. In the pack held between twin glass plates, the solution was polymerized and crosslinked, giving a gel sample.

Gels in the form of a membrane 200 μm in thickness were used as gel samples in Examples 42 to 84.

Measurement of Sodium Ion Concentration

The concentration of sodium ions in the gel or the polymer was measured by atomic absorption method using a measurement device ("AA-6500", product of Shimadzu Mfg. Co., Ltd.). The limit of detected value was 10 ppm. When the concentration of sodium ions in the polymer constituting the gel was measured, the gel was heated under reduced pressure to remove the nonaqueous solvent and was dried under reduced pressure for 24 hours before measurment. Thereafter the measurement was carried out.

(I) Examples using, as the polymer component, a crosslinked polymer having nitrogen-containing cationic functional group which was prepared by polymerizing and crosslinking an unsaturated monomer free of nitrogen-containing cationic functional group, an unsaturated monomer having nitrogen-containing cationic functional group and a crosslinkable monomer.

EXAMPLE 1

Acrylonitrile (100 parts), 60 parts of dimethylaminoethyl methacrylate (tertiary amine compound) and 15 parts of 1,9-nonanediol dimethacrylate (crosslinkable monomer) were mixed with 1,000 parts of a nonaqueous solvent containing 80 parts of $LiBF_4$ as an electrolyte dissolved in 920 parts of a solvent comprising a mixture of ethylene carbonate/diethyl carbonate at 2/1 mole ratio.

Five parts of benzyldimethyl ketal as a polymerization catalyst was added to the solution with ultraviolet rays shut off to give a composition solution.

The above procedure was carried out in a globe box with the air replaced with nitrogen gas. The content of water in the composition solution was 80 ppm.

Ten grams of the composition solution was poured into a seal pack of polyethylene film 100 μm in thickness containing a piece of non-woven fabric of polyolefin 25 μm in thickness as a support for the gel, and was defoamed under reduced pressure. Then the pack was heat-sealed.

The seal pack as pressed at both sides between twin quartz glass plates was irradiated with ultraviolet rays (peak wavelength of 350 nm) at an irradiance of 15 mW/cm² for 5 minutes to undergo polymerization and crosslinking reactions, giving a gel membrane 120 μm in thickness comprising a crosslinked polymer having nitrogen-containing cationic functional group as the polymer component.

The concentration of lithium ions in the gel membrane thus obtained was calculated and was 5,000 ppm or more.

The concentration of sodium ions was measured by an atomic absorption method and was 75 ppm based on the weight of the copolymer and 11.4 ppm when calculated as that in the gel. The concentrations of ions in alkali metals other than lithium and sodium and alkaline earth metals such as potassium, calcium or magnesium were below the level of the detected sensitivity (10 ppm).

The gel membrane was taken out from the seal pack within the globe box with the air replaced with argon gas, and cells for evaluation of electrochemical properties were assembled to evaluate the electrochemical properties.

The evaluation results of electrochemical properties, heat resistance and flexibility were tabulated in Table 1.

COMPARATIVE EXAMPLE 1

The same procedure as in Example 1 was repeated by using 100 parts of acrylonitrile and 15 parts of 1,9-nonanediol dimethacrylate with the exception of using 10 parts of vinyl acetate to produce a gel membrane. The electrochemical properties, heat resistance and flexibility were evaluated. The concentration of sodium ions in the gel membrane as measured in the same manner as in Example 1 was 80 ppm based on the weight of the copolymer and was 9.2 ppm when calculated as that in the gel.

COMPARATIVE EXAMPLE 2

The same procedure as in Example 1 was repeated by using 100 parts of acrylonitrile and 15 parts of 1,9-nonanediol dimethacrylate with the exception of using 10 parts of methyl acrylate to produce a gel membrane. The electrochemical properties, heat resistance and flexibility were evaluated. The concentration of sodium ions in the gel membrane as measured in the same manner as in Example 1 was 100 ppm based on the weight of the copolymer and was 11.5 ppm when calculated as that in the gel.

COMPARATIVE EXAMPLE 3

A 3-liter polymerization flask was charged with 2,500 ml of pure water, and with 95 parts of acrylonitrile, 4.7 parts of vinyl acetate, 0.2 part of sodium methallyl sulfonate, 1.0 part of sodium sulfite and 0.5 part of sodium perchlorate as a polymerization catalyst. The solution was adjusted to a pH of 2.8 with 30% nitric acid and was heated to 60° C. to undergo polymerization reaction for 3 hours.

The thus obtained copolymer was sufficiently washed with pure water and dried under reduced pressure to remove the water. The concentration of sodium ions in the copolymer was 1,200 ppm and was 157 ppm when calculated as that in the gel.

Fifteen parts of the dried copolymer was mixed with 100 parts of the same nonaqueous solvent containing an electrolyte as used in Example 1. Then the solution was heated to 120° C. to dissolve the copolymer.

The obtained solution was cooled to 80° C., was poured as done in Example 1 into a seal pack of polyethylene film containing a piece of non-woven fabric having a thickness of 25 μm as a support for the gel, and was defoamed under reduced pressure. The seal pack as held between twin glass plates was cooled to room temperature, giving a gel membrane having a thickness of 120 μm. The electrochemical properties, heat resistance and flexibility were evaluated in the same manner as in Example 1.

The results of Example 1, and Comparative Examples 1 to 3 are shown in Table 1.

TABLE 1

| | Ion conductivity ($\times 10^{-3}$ S/cm) | Polarizing current value (mA) | Increase ratio of interfacial resistance | Heat resistance | Flexibility |
|---|---|---|---|---|---|
| Ex. 1 | 3.8 | 5.0 | 1.2 times | A | A |
| Comp. Ex. 1 | 2.6 | 1.0 | 4.9 times | A | A |
| Comp. Ex. 2 | 2.7 | 1.2 | 4.2 times | A | A |
| Comp. Ex. 3 | 2.5 | 0.9 | 5.5 times | C | A |

As clear from Table 1, the gel of the present invention was high in ion conductivity, low in increase ratio of interfacial resistance and excellent in stability.

The gel of the invention was much increased in polarizing current value as compared with the gels of Comparative Examples 1 and 2 prepared without using the monomer having nitrogen-containing cationic functional group, and with the gel of Comparative Example 3 prepared by the conventional process using a usual non-crossliked acrylonitrile polymer. Using the gel of the invention, it is possible to produce secondary batteries with an electric capacity 5 times as large as that of conventional secondary batteries of the same size.

The gel of Comparative Example 1 prepared without copolymerizing the monomer having nitrogen-containing cationic functional group was instable in nterfacial resistance and low in polarizing current value although satisfactory in heat resistance and flexibility, failing to meet the requirements for high performance of small-size devices. The gel of Comparative Example 2 was inferior in ion conductivity and polarizing current value as compared with the gel of Example 1 (product of present invention) although low in concentration of sodium ions and satisfactory in heat resistance and flexibility, because of preparation of the gel without copolymerizing the monomer having nitrogen-containing cationic functional group. The gel of Comparative Example 3 was lower in ion conductivity and polarizing current value than the gel of Example 1, and showed an abrupt increase of interfacial resistance. The gel of Comparative Example 3 was instable as an electrolytic gel for electrochemical devices.

EXAMPLES 2 to 7

When a nonaqueous solvent containing ethylene carbonate/diethyl carbonate at 2/1 mole ratio containing 8% $LiBF_4$ as an electrolyte dissolved therein was added to a mixture of 100 parts of acrylonitrile, 30 parts of dimethylaminoethyl acrylate and 10 parts of hexaethylene oxide dimethacrylate, the amount of the nonaqueous solvent was changed to 250 parts, 500 parts, 1,000 parts, 2,500 parts, 4,000 parts and 5,000 parts. Azobisisobutyronitrile (1.5 parts) was added as a polymerization catalyst to give a composition solution. Fifty grams of the composition solution was poured into the seal pack of polyethylene film as described in the method of evaluating the flexibility, and the pack was held between twin glass plates. Then the contents were subjected to polymerization and crosslinking reactions in a hot-air circulating thermostatic container at 65° C. for 2 hours to give a gel membrane. The sample was cooled to room temperature and the flexibility was evaluated.

Ten grams of the same composition solution was poured into the same seal pack of polyethylene film containing a piece of non-woven fabric as described in Example 1, and was defoamed under reduced pressure. The pack was heat-sealed and was held between twin glass plates. The solution was subjected to polymerization and crosslinking reactions in a hot-air circulating thermostatic container at 65° C. for 2 hours to give a gel membrane having a thickness of 120 μm. Using the gel membranes, the electrochemical properties were evaluated in the same manner as in Example 1.

The results are shown in Table 2.

TABLE 2

|  | Amount of nonaqueous solvent used | Flexibility | Ion conductivity ($\times 10^{-3}$S/cm) | Polarizing Current value (mA) |
| --- | --- | --- | --- | --- |
| Ex. 2 | 250 parts | B | 2.9 | 3.4 |
| Ex. 3 | 500 parts | A | 3.2 | 4.3 |
| Ex. 4 | 1,000 parts | A | 3.7 | 4.9 |
| Ex. 5 | 2,500 parts | A | 3.8 | 5.0 |
| Ex. 6 | 4,000 parts | A | 3.8 | 5.0 |
| Ex. 7 | 5,000 parts | A | 3.8 | 4.8 |

As clear from Table 2, the gel membranes of Examples 2 to 7 using 250 to 5,000 parts of nonaqueous solvent retained flexibility sufficient to be useful, and those using 500 to 5,000 parts were particularly suitable. The gel membranes generally had an ion conductivity of $3 \times 10^{-3}$ S/cm or more and were superior in polarizing current value.

EXAMPLES 8 to 10

Gel membranes were prepared in the same manner as in Example 1 by adding 30 parts of vinyl acetate (Example 8), 30 parts of methyl acrylate (Example 9) or 30 parts of methacrylic acid (Example 10) as the 4th component to the same composition solution as used in Example 1. Using the gel membranes, the electrochemical properties, heat resistance and flexibility were evaluated.

The results are shown in Table 3.

TABLE 3

|  | Ion conductivity ($\times 10^{-3}$ S/cm) | Polarizing current value (mA) | Increase ratio of interfacial resistance | Heat resistance | Flexibility |
| --- | --- | --- | --- | --- | --- |
| Ex. 8 | 3.2 | 4.3 | 1.5 times | A | A |
| Ex. 9 | 2.8 | 3.7 | 2.0 times | A | A |
| Ex. 10 | 2.7 | 2.5 | 2.3 times | A | A |

As apparent from Table 3, gel membranes with satisfactory ion conductivity and polarizing current value were prepared even by using as the 4th component the monomer such as nonionic vinyl acetate or methyl acrylate, and less mole equivalent of the carboxylic acid monomer than dimethylaminoethyl methacrylate (methacrylic acid of Example 10 corresponds to about 0.9 mole equivalent of dimethylaminoethyl methacrylate).

EXAMPLES 11 to 16

Gel membranes were produced in the same manner as in Example 1 with the exception of changing only the amount of the crosslinkable monomer used. Using the gel membranes, the electrochemical properties, heat resistance and flexibility were evaluated.

Stated more specifically, the procedure of Example 1 was conducted by using 100 parts of acrylonitrile, 60 parts of dimethylaminoethyl methacrylate, and 1 part (Example 11), 5 parts (Example 12), 10 parts (Example 13), 25 parts (Example 14), 35 parts (Example 15) or 50 parts (Example 16), of 1,9-nonanediol dimethacrylate as the crosslinkable monomer.

The results are shown in Table 4.

TABLE 4

|  | Amount of crosslinkable monomer used | Ion conductivity ($\times 10^{-3}$S/cm) | Flexibility |
| --- | --- | --- | --- |
| Ex. 11 | 1 part | 4.0 | A |
| Ex. 12 | 5 parts | 3.9 | A |
| Ex. 13 | 10 parts | 3.8 | A |
| Ex. 14 | 25 parts | 3.6 | A |
| Ex. 15 | 35 parts | 3.2 | B |
| Ex. 16 | 50 parts | 3.0 | B |

As apparent from Table 4, satisfactorily flexible gel membranes were obtained by using the above-listed amounts of the crosslinkable monomer.

EXAMPLES 17 to 23

Gel membranes were produced in the same manner as in Example 1 with the exception of changing only the amount of the monomer having nitrogen-containing cationic functional group. Using the obtained gel membranes, the electrochemical properties, heat resistance and flexibility were evaluated.

Stated more specifically, the procedure of Example 1 was conducted by using 100 parts of acrylonitrile, 5 parts of polyethylene glycol (MW 600) dimethacrylate as a crosslinkable monomer, and 1.0 part (Example 17), 5 parts (Example 18), 10 parts (Example 19), 20 parts (Example 20), 50 parts (Example 21), 100 parts (Example 22) or 150 parts (Example 23), of dimethylaminoethyl methacrylate.

The results of evaluation are shown in Table 5.

TABLE 5

|  | Ion conductivity ($\times 10^{-3}$ S/cm) | Polarizing current value (mA) | Increase ratio of interfacial resistance | Heat resistance | Flexibility |
| --- | --- | --- | --- | --- | --- |
| Ex. 17 | 2.9 | 2.2 | 2.0 times | A | A |
| Ex. 18 | 3.2 | 3.0 | 1.5 times | A | A |
| Ex. 19 | 3.7 | 4.5 | 1.5 times | A | A |
| Ex. 20 | 3.9 | 5.1 | 1.3 times | A | A |
| Ex. 21 | 3.9 | 5.0 | 1.2 times | A | A |
| Ex. 22 | 3.8 | 4.8 | 1.4 times | A | A |
| Ex. 23 | 3.8 | 4.8 | 1.4 times | A | A |

As apparent from Table 5, the amount of dimethylaminoethyl methacrylate was desirably in the range of 1 to 100 parts. Particularly the use of 10 to 100 parts gave good results. The use of 150 parts gave the same polarizing current value as the use of 100 parts. The gel obtained in Example 23 changed its color after evaluation of heat resistance, but the gel remained usable.

EXAMPLES 24 to 30

Gel membranes were prepared by the same procedure as in Example 1 with the exception of using 20 parts of the following unsaturated monomers having nitrogen-containing cationic functional group in place of 60 parts of dimethylaminoethyl methacrylate used in Example 1. Using the obtained gel membranes, the electrochemical properties, heat resistance and flexibility were evaluated.

The monomers used were aminoethyl methacrylate (primary amine) in Example 24, N-monoethylaminoethyl methacrylate (secondary amine) in Example 25, N-diethylaminoethyl methacrylate (tertiary amine) in Example 26, N-trimethylaminoethyl methacrylate hydroxide (quaternary ammonium compound) in Example 27, N-aminoethyl methallylamine (a mixture of primary and secondary amines) in Example 28, N-dimethylaminopropyl methallylamine (a mixture of secondary and tertiary amines) in Example 29, and N-diethylaminoethyl methacrylate nitrate (nitrate of tertiary amine) in Example 30.

The evaluation results of the obtained gel membranes are shown in Table 6.

TABLE 1

|  | Ion conductivity ($\times 10^{-3}$ S/cm) | Polarizing current value (mA) | Increase ratio of interfacial resistance | Heat resistance | Flexibility |
| --- | --- | --- | --- | --- | --- |
| Ex. 24 | 3.0 | 4.3 | 2.0 times | A | A |
| Ex. 25 | 3.3 | 4.6 | 1.7 times | A | A |
| Ex. 26 | 3.8 | 4.9 | 1.5 times | A | A |
| Ex. 27 | 3.7 | 4.8 | 1.4 times | A | A |
| Ex. 28 | 4.0 | 5.0 | 1.6 times | A | A |
| Ex. 29 | 3.9 | 4.9 | 1.5 times | A | A |
| Ex. 30 | 3.1 | 3.2 | 4.5 times | A | A |

As apparent from Table 6, the gels using any of said unsaturated monomers having nitrogen-containing cationic functional group were outstanding in ion conductivity and polarizing current value, but were defective in that the gel using a nitrate of tertiary amine as the monomer had a high increase ratio of interfacial resistance. Thus it is recommendable to use a free amino monomer not having formed a salt.

EXAMPLES 31 to 34

Gel membranes were prepared by the same procedure as in Example 1 with the exception of using the following solutions in place of the solution containing ethylene carbonate/diethyl carbonate at 2/1 mole ratio having 8% $LiBF_4$ dissolved therein as the nonaqueous solvent having an electrolyte. The solutions used were a solution containing ethylene carbonate/propylene carbonate at 2/1 mole ratio having 8% $LiBF_4$ in Example 31, a solution containing ethylene carbonate/dimethyl carbonate at 1/1 mole ratio having 8% $LiBF_4$ in Example 32, a solution containing ethylene carbonate/diethyl carbonate at 1/1 mole ratio having 8% $LiBF_4$ in Example 33, and a solution containing γ-butyrolactone having 8% $LiBF_4$ in Example 34.

A composition solution was produced by mixing 5 g of acrylonitrile, 1.5 g of diethylaminopropyl metacrylate, 0.8 g of polyethylene glycol (MW 600) dimethacrylate, 40 g of each of said solutions (nonaqueous solvents) and 0.04 g of 4,4'-azobis(4-cyanovaleric acid) as a polymerization catalyst and was placed onto a petri dish 10 cm in diameter. Then the dish was covered with an aluminum foil piece.

The treated composition solution was placed into a thermostatic container at 65° C. and was heat-treated for 1 hour to undergo polymerization and crosslinking reactions, giving a gel. Thereafter the gel was heated to 80° C. for 1 hour according to the foregoing method of evaluating the heat resistance although using a different container to evaluate the loss of weight, heat resistance of the gel and flexibility thereof.

The results are shown in Table 7.

TABLE 7

|  | Boiling point Of solvent used (° C.) | Loss of weight (g) | Heat Resistance | Flexibility |
| --- | --- | --- | --- | --- |
| Ex. 31 | 238, 242 | 3 | A | A |
| Ex. 32 | 238, 90 | 16 | A | B |
| Ex. 33 | 238, 127 | 9 | A | A |
| Ex. 34 | 204 | 5 | A | A |

As apparent in Table 7, the gel of Example 32 using dimethyl carbonate having a boiling point of 90° C. showed more loss of weight than in using a nonaqueous solvent with a boiling point of above 90° C. This confirmed that it is advantageous to use a solvent having a high boiling point. Further the evaporation of solvent-reduced the flexibility of the gel, facilitating the collapse of the gel. Thus it is desirable that the use of a solvent having a boiling point of not more than 90° C. should be avoided to obtain a heat-resistant gel.

EXAMPLES 35 to 40 AND COMPARATIVE EXAMPLE 4

Gel membranes were prepared as described below using the following crosslinkable monomers having at least two reactive functional groups per molecule. The monomers used were polyethylene glycol (MW 600) diglycidyl ether in Example 35, hydroxyethyl methacrylate in Example 36, methylol acrylamide in Example 37, methylenebis acrylamide in Example 38, trimethylolpropane trimethacrylate in Example 39, and pentaerythritol tetraacrylate in Example 40. In Comparative Example 4, no crosslinkable monomer was used.

Ten grams of acrylontrile, 3 g of dimethylaminoethyl methacrylate and 2 g of each of said crosslinkable monomers were mixed together, followed by adding 80 g of the solution containing ethylene carbonate/diethyl carbonate at 2/1 mole ratio having 8% $LiBF_4$ dissolved therein and 0.1 g of 4,4'-azobis (4-cyanovaleric acid) as a polymerization catalyst to give a composition solution. The composition solution was poured into a bag of laminated aluminum film containing as a spacer a silicone rubber sheet having a thickness of 1 mm and the bag was sealed. The sealed bag was held between twin glass plates and heated at 70° C. for 1 hour to undergo polymerization and crosslinking reactions for gelation. The bag of laminated aluminum film containing the gel was bent at an angle of 90 degrees as done in the evaluation of flexibility. One side of the bag was removed to observe the condition of the gel composition.

The results are shown in Table 8.

TABLE 8

|  | Flexibility |
| --- | --- |
| Example 35 | A |
| Example 36 | A |
| Example 37 | A |
| Example 38 | A |
| Example 39 | A |
| Example 40 | A |
| Comp. Ex. 4 | Solution-like |

As apparent from Table 8, each of the gels of Examples 35 to 40 showed good flexibility, whereas in Comparative Example 4, the same procedure was carried out without using any crosslinkable monomer, and polymerization occurred only to give a viscous solution, failing to give a gel.

EXAMPLES 41

Ten grams of acrylontrile, 3 g of dimethylaminoethyl methacrylate, 3 g of hydroxyethyl acrylate and 1.5 g of paraphenylene diisocyanate were mixed together, followed by adding 80 g of a solution containing ethylene carbonate/diethyl carbonate at 2/1 mole ratio having 8% $LiBF_4$ dissolved therein and 0.1 g of 4,4'-azobis(4-cyanovaleric acid) as a polymerization catalyst to give a composition solution. The composition solution was treated in the same manner as in Example 35 to produce a gel which was rated as A in the evaluation of flexibility.

(II) Examples using, as the polymer component of a gel, a crosslinked polymer having nitrogen-containing cationic functional group, the crosslinked polymer being prepared by polymerizing an unsaturated monomer free of nitrogen-containing cationic functional group and an unsaturated monomer having nitrogen-containing cationic functional group to give a non-crosslinked polymer, and crosslinking the obtained non-crosslinked polymer with a crosslinking agent.

EXAMPLES 42

A nonaqueous solvent containing an electrolyte was prepared by dissolving 93.75 g of $LiBF_4$ as an electrolyte in 1 liter of a nonaqueous solvent containing ethylene carbonate/propylene carbonate at 2/1 mole ratio. Added to 80 g of the nonaqueous solvent containing an electrolyte were 10 g of acrylonitrile, 5 g of dimethylaminoethyl acrylate, 5 g of hydroxyethyl methacrylate and 0.6 g of benzyldimethyl ketal as a polymerization catalyst to give a solution. The obtained solution was irradiated for 10 minutes with ultraviolet rays having a peak wavelength of 360 nm and an irradiance of 15 mW/cm$^2$ at 360 nm to undergo polymerization reaction. Then the solution was placed into a vacuum container having a gauge pressure of 0.01 MPa at 50° C. to remove the unreacted acrylonitrile, giving a solution of a polymer having nitrogen-containing cationic functional group.

Aside from the above procedure, a solution was prepared by mixing 60 g of the same nonaqueous solvent containing an electrolyte with 40 g of 2,4-tolylene diisocyanate as a crosslinking agent.

A lithium foil piece 0.2 mm in thickness was placed on the bottom of a petri dish of stainless steel, and a square spacer of Teflon 0.2 mm in thickness was set over the foil piece. A suitable amount of a solution containing 12.5 g of said polymer solution and 2.5 g of said crosslinking agent solution was poured into the dish, and a lithium foil piece 0.2 mm in thickness was placed thereon, followed by covering the dish with a lid and heating at 90° C. for 2 hours to crosslink the polymer with the crosslinking agent, giving a gel membrane 200 μm in thickness, i.e. the polyelectrolytic gel of the present invention.

The gel membrane held between twin lithium foil pieces was further held between twin nickel plates 0.3 mm in thickness with a lead wire attached thereto, was inserted in this state into between twin glass plates, and was fixed with a clip to assemble a cell for evaluation of electrochemical properties. The cell was connected to a measurement device to evaluate electrochemical properties.

A gel for evaluation of heat resistance and flexibility was prepared in the same manner as in the preparation of the above gel membrane with the exception of not using a lithium foil piece. The heat resistance and flexibility were evaluated by the evaluation methods described hereinbefore.

The preparation of gel membranes and assemblage of cells were carried out using a glove box having a dew point of −50° C. in an argon gas atmosphere.

EXAMPLE 43

Added to 85 g of the same nonaqueous solvent containing an electrolyte as used in Example 42 were 12 g of acrylonitrile and 3 g of methallylamine, followed by adding 0.45 g of benzyldimethyl ketal. The solution was irradiated with ultraviolet rays in the same manner as in Example 42 to undergo polymerization reaction, and was subjected to vacuum pressure treatment in the same manner to remove the unreacted acrylonitrile, giving a solution of a polymer having nitrogen-containing cationic functional group. Aside from this operation, a crosslinking agent solution was prepared by dissolving 30 g of polyethylene glycol diglycidyl ether having a polymerization degree of 9 as a crosslinking agent in 70 g of the same nonaqueous solvent containing an electrolyte as used in Example 42.

Added to 10 g of said polymer solution was 5 g of said crosslinking agent solution to give a composition solution. The obtained composition solution was treated in the same manner as in Example 42 to produce a gel membrane 200 μm in thickness, i.e. the polyelectrolytic gel of the present invention. A cell was assembled in the same manner. Using the obtained gel membranes and cells, the electrochemical properties, heat resistance and flexibility were evaluated.

EXAMPLE 44

Added to 80 g of a nonaqueous solvent having 93.75 g of $LiBF_4$ as an electrolyte dissolved in 1 liter of a nonaqueous solvent containing ethylene carbonate/γ-butyrolactone at 1/3 mole ratio were 12 g of acrylonitrile, 4 g of dimethylaminoethyl acrylate and 4 g of hydroxyethyl methacrylate, followed by adding 0.6 g of benzyldimethyl ketal as a polymerization catalyst. A solution of a polymer having nitrogen-containing cationic functional group was prepared in the same manner as in Example 42. Ten grams of the polymer solution was added to 5 g of the same crosslinking agent solution as used in Example 42, giving a gel membrane in the same manner as in Example 42. Then, cells were assembled in the same manner as in Example 42. The properties were evaluated.

EXAMPLE 45

A 2-liter polymerization flask disposed in a thermostatic container set at 65° C. was charged with 800 ml of pure water adjusted to a pH of 2.0 with nitric acid. Continuously fed to the flask for 2 hours were a solution containing 106 g of acrylonitrile, 14.3 g of dimethylaminoethyl acrylate and 39 g of hydroxyethyl methacrylate, and separately a solution of 2,2'-azobis(2-amidinopropane) dihydrochloride as a polymerization catalyst in 120 ml of pure water.

After completion of the supply, the polymerization was continued at 65° C. for 2 hours. The pH of the contents in the flask was 2.6 on completion of the polymerization. Thereafter, the flask was cooled to room temperature with water, and the contents were dehydrated by a centrifugal dehydrator to provide a polymer having nitrogen-containing cationic functional group.

The obtained cationic polymer was washed with pure water three times to remove the unreacted monomer and residual polymerization catalyst. Then the resulting polymer was washed three times with an aqueous solution of lithium hydroxide heated to 50° C. and having a pH of 10.5, and was further washed three times with pure water. The cationic polymer was dried by a vacuum drier at 70° C. overnight to remove the water.

The polymer was subjected to infrared absorption spectrum measurement with the result that peaks of $NO_3^-$ appeared at 1385 $cm^{-1}$ in the measurement before washing the polymer with the aqueous solution of lithium hydroxide, whereas peaks completely disappeared in the measurement after washing the polymer with said aqueous solution. Consequently it was confirmed that $NO_3^-$ having formed a salt with dimethylaminoethyl acrylate was completely removed.

The cationic polymer comprised acrylo-nitrile/dimethylaminoethyl acrylate/hydroxyethyl methacrylate at a mole ratio of 86/4/10 and had a weight average molecular weight of 120,000.

15 g of the cationic polymer of Example 45 was mixed well with 85 g of the same nonaqueous solvent containing an electrolyte as used in Example 42, and the obtained solution was heated to 100° C. for complete dissolution, giving a polymer solution.

10 g of the obtained polymer solution was mixed with 5 g of the same crosslinking agent solution as used in Example 42. Gel membranes and cells were produced in the same manner as in Example 42. Thereafter the properties were evaluated.

EXAMPLES 46 AND 47

8.5 g of a nonaqueous solvent having 8 parts of $LiBF_4$ as an electrolyte dissolved in 92 parts of a nonaqueous solvent containing ethylene carbonate/γ-butyrolactone at 1/3 mole ratio was mixed with 1.2 g of acrylonitrile, 0.3 g of N-dimethylaminopropyl methacrylamide, 0.2 g of N-methylol acrylamide and 0.05 g of benzyldimethyl ketal as a polymerization catalyst. The obtained solution was polymerized by UV irradiation in the same manner as in Example 42, giving a solution of a polymer having nitrogen-containing cationic functional group.

Added to the polymer solution thus obtained was 5 g of the same crosslinking agent solution as used in Example 42 to give a composition solution.

To prepare a gel membrane from the composition solution in the same manner as in Example 42, the same procedure as in Example 42 was conducted with the exception of pouring the composition solution into the petri dish after placing a non-woven fabric piece of polypropylene 25 μm in thickness (weave density 7 g/cm²) over the lithium foil piece put on the bottom of the petri dish of stainless steel. Then cells were produced in the same manner as in Example 42. The properties were evaluated.

Aside from said procedure, a gel membrane without lithium foil was prepared in Example 47 in the same manner as in Example 46 with the exception of not using the lithium foil piece. The gel membrane thus obtained was taken out from the petri dish, and a cell for evaluation was assembled by attaching to both sides the same lithium foil piece and the same nickel plates as used in Example 42. Using the obtained cells, the properties were evaluated in the same manner as above.

The results of Examples 42 to 47 are shown in Table 9.

TABLE 9

| | Concentration of sodium ions (ppm) | Ion conductivity (×10⁻³ S/cm, 25° C.) | Increase ratio of interfacial resistance |
|---|---|---|---|
| Ex. 42 | 10 or less | 4.8 | 1.2 times |
| Ex. 43 | 10 or less | 4.3 | 1.3 times |
| Ex. 44 | 10 or less | 4.8 | 1.2 times |
| Ex. 45 | 10 or less | 4.8 | 1.2 times |
| Ex. 46 | 10 or less | 4.6 | 1.3 times |
| Ex. 47 | 10 or less | 3.1 | 2.1 times |

| | Polarizing current value (mA) | Heat resistance | Flexibility |
|---|---|---|---|
| Ex. 42 | 9.3 | A | A |
| Ex. 43 | 8.8 | A | A |
| Ex. 44 | 9.3 | A | A |
| Ex. 45 | 9.3 | A | A |
| Ex. 46 | 10.8 | A | A |
| Ex. 47 | 5.8 | A | A |

As apparent from Table 9, the gel of Example 42 was high in ion conductivity and superior in heat resistance and flexibility. The gel had a crosslinked structure formed by a reaction of methylol group in the polymer having nitrogen-containing cationic functional group with isocyanate group of the crosslinking agent so that when heated even to 150° C., the gel showed no change in shape and had high heat stability.

Table 9 shows that the following were proved: the gel of Example 43 had excellent electrochemical properties, high heat resistance and superior flexibility; the gel of Example 44 underwent no change in shape even when heated to 80° C., and was excellent in heat resistance and flexibility and outstanding in electrochemical properties; and the gel of Example 45 was high in any of heat stability, flexibility and electrochemical properties.

The following is also clear from comparison of Examples 46 and 47 in Table 9. The gel of the present invention was sufficiently suitable for practical use, even when a cell was constructed by conventional methods wherein as in Example 47, after a gel membrane was formed, electrode materials were attached to the gel membrane. However, the gel of Example 47 was low in ion conductivity and showed a slightly high increase ratio of interfacial resistance, namely was generally low in electrochemical properties, as compared with the case of Example 46 wherein the crosslinking agent solution and the solution of non-crosslinked polymer essentially comprising a nonaqueous solvent, an electrolyte and a cationic polymer were poured into an electrochemical device such as a cell to bring out gelation inside the device.

EXAMPLES 48 TO 53

A solution of a polymer having nitrogen-containing cationic functional group was prepared in the same manner as in Example 42, i.e. by UV irradiation for polymerization and by the same treatment as done in Example 42, with the exception of using 5 g of each of the following unsaturated monomers having nitrogen-containing cationic functional group, 92 g of acrylonitrile and 3 g of hydroxyethyl methacrylate.

The unsaturated monomers having nitrogen-containing cationic functional group used were aminoethyl methacrylate (primary amine) in Example 48, N-monoethylaminoethyl methacrylate (secondary amine) in Example 49, N-diethylaminoethyl methacrylate (tertiary amine) in Example 50, N-trimethylaminoethyl methacrylate hydroxide (quaternary ammonium compound) in Example 51, N-aminoethyl methallylamine (a mixture of primary and secondary amines) in Example 52, and N-dimethylaminopropyl methallylamine (a mixture of secondary and tertiary amines)in Example 53.

Added to 10 g of each of these cationic polymer solutions was 5 g of the same crosslinking agent solution as used in Example 42 to produce a composition solution. A gel membrane and a cell were produced in the same manner as in Example 42. The properties were evaluated in the same manner.

The concentrations of sodium ions in the gels were all less than the level of detected sensitivity (10 ppm).

EXAMPLES 54 AND 55

A solution of a polymer having nitrogen-containing cationic functional group was prepared in the same manner as in Example 42 with the exception of using, as monomers, 9 g of acrylonitrile, 0.4 g of N-dimethylaminoethyl acrylate (Example 54) or acetate of N-dimethylaminoethyl acrylate (Example 55) and 0.6 g of N-methylol acrylamide, by polymerizing the mixture by UV irradiation as done in Example 42.

A composition solution was prepared by adding 5 g of the same crosslinking agent solution as used in Example 42 to the polymer solution. A gel membrane was formed and a cell was assembled in the same manner as in Example 42. The properties were evaluated.

EXAMPLE 56

A gel membrane and a cell were produced in the same manner as in Example 42 with the exception of using 10 g of the solution of a polymer having nitrogen-containing cationic functional group which was prepared in the same manner as in Example 42, 2.5 g of the same crosslinking agent solution as used in Example 42 and 2.5 g of dimethoxypolyethylene glycol having a molecular weight of about 1,200. The properties were evaluated in the same manner as in Example 42.

The results of Examples 48 to 56 are shown in Table 10.

TABLE 10

| | Ion conductivity (X $10^{-3}$ S/cm, 25° C.) | Polarizing current value (mA) | Increase ratio of interfacial resistance | Heat resistance | Flexibility |
|---|---|---|---|---|---|
| Ex. 48 | 3.9 | 7.5 | 1.4 times | A | A |
| Ex. 49 | 3.7 | 7.0 | 1.4 times | A | A |
| Ex. 50 | 4.3 | 9.6 | 1.0 time | A | A |
| Ex. 51 | 4.6 | 10.3 | 1.0 time | A | A |
| Ex. 52 | 4.1 | 8.8 | 1.2 times | A | A |
| Ex. 53 | 4.0 | 9.0 | 1.1 times | A | A |
| Ex. 54 | 4.3 | 9.5 | 1.2 times | A | A |
| Ex. 55 | 3.5 | 8.0 | 1.5 times | A | A |
| Ex. 56 | 5.0 | 10.6 | 1.1 times | A | A |

As apparent from Table 10, the gel membranes of Examples 48 to 53 prepared from the cationic polymer showed an ion conductivity of $3\times10^{-3}$ S/cm or more at an ambient temperature (25° C.) and a polarizing current value of 6 mA/cm$^2$ or more, and were proved to be superior as a polyelectrolytic gel.

The gel of Example 55 wherein the amino group of amino-containing monomer formed a salt with acetic acid had good properties although slightly inferior to the gel of Example 54. The reason is presumably that the acetic acid having formed a salt with the amino group is a weak acid so that $CH_3COO^-$ was substituted with $BF_4^-$ of $LiBF_4$ as an electrolyte to result in release of acetic acid having formed a salt with the amino group, rendering it unlikely to hinder the movement of $Li^+$.

The gel of Example 56 was excellent in any of heat resistance, flexibility and electrochemical properties, and had an ion conductivity of $1.0\times10^{-3}$ S/cm as measured at $-20°$ C. Thus it was confirmed that the gel was outstanding in low-temperature properties of batteries.

(III) Examples using, as the polymer component of a gel, a mixture of a non-crosslinked polymer having nitrogen-containing cationic functional group and a crosslinked polymer free of cationic functional group which mixture is obtained by polymerizing and crosslinking a polymerizable compound having crosslinkable functional groups in the presence of a non-crosslinked polymer having nitrogen-containing cationic functional group.

EXAMPLE 57

A 2-liter polymerization flask disposed in a thermostatic container set at 65° C. was charged with 800 ml of pure water adjusted to a pH of 2.0 with nitric acid. Continuously fed to the flask for 2 hours were a solution containing 106 g of acrylonitrile and 14.3 g of dimethylaminoethyl acrylate as a monomer having nitrogen-containing cationic functional group, and separately a solution of 1.2 g of 2,2'-azobis (2-amidinopropane) dihydrochloride as a polymerization catalyst in 120 ml of pure water to undergo polymerization reaction.

Thereafter the polymerization was continued at 65° C. for 2 hours to give a polymer having nitrogen-containing cationic functional group. The pH of the contents in the flask was 2.7 upon completion of polymerization. Thereafter, the flask was cooled to room temperature with water. Then the contents of the flask were dehydrated by a centrifugal dehydrator and the cationic polymer was taken out.

The obtained cationic polymer was washed with pure water three times to remove the unreacted monomer and residual polymerization catalyst. Further the polymer was washed three times with an aqueous solution of lithium hydroxide heated to 50° C. and having a pH of 10.5, and was washed again with pure water three times. The cationic polymer was dried by a vacuum drier at 70° C. overnight to remove the water.

The polymer was subjected to infrared absorption spectrum measurement with the result that peaks of $NO_3^-$ appeared at 1385 cm$^{-1}$ in the measurement before washing the polymer with the aqueous solution of lithium hydroxide, whereas peaks completely disappeared in the measurement after washing the polymer with said aqueous solution. Consequently it was confirmed that $NO_3^-$ having formed a salt with dimethylaminoethyl acrylate was completely removed.

The cationic polymer comprised acrylonitrile/ dimethylaminoethyl acrylate at a mole ratio of 95/5 and had a weight average molecular weight of 200,000.

Ten grams of the dried cationic polymer was added to 90 g of a nonaqueous solvent containing 8 g of $LiBF_4$ as an electrolyte dissolved in 92 g of a nonaqueous solvent containing ethylene carbonate/propylene carbonate at 2/1 mole ratio. The solution was then heated to 100° C. to give a cationic polymer solution.

A solution of a polymerizable compound having crosslinkable functional groups was prepared by dissolving 10 g of polyoxyethylene dimethacrylate having a polymerization degree of 14 in 90 g of the same nonaqueous solvent containing an electrolyte.

A lithium foil piece 0.2 mm in thickness was placed on the bottom of a petri dish of stainless steel, and a square spacer of Teflon 0.2 mm in thickness was set over the lithium foil piece. A suitable amount of a composition solution containing 10 g of said polymer solution, 5 g of said polymerizable compound solution and 0.2 g of di-t-butyl peroxide was poured into the dish. A lithium foil piece 0.2 mm in thickness was also placed thereover, followed by covering the dish with a lid and heating at 90° C. for 1 hour to crosslink the polymerizable compound, giving a gel membrane 200 μm in thickness, i.e. the polyelectrolytic gel of the present invention.

The gel membrane held between twin lithium foil pieces was further sandwiched between twin nickel plates 0.3 mm in thickness with a lead wire attached thereto, was inserted into between twin glass plates, and was fixed with a clip to assemble a cell for evaluation of electrochemical properties. The cell was connected to a measurement device to evaluate electrochemical properties.

Gels for evaluation of heat resistance and flexibility were prepared in the same manner as above with the exception of not using the lithium foil piece.

The preparation of gel membranes, assemblage of cells and measurement of electrochemical properties were carried out using a glove box having a dew point of −50° C. in an argon gas atmosphere.

The proportions of the monomers for the cationic polymer prepared in Example 57 were 95/5 of acrylontrile/dimethylaminoethyl acrylate. The cationic polymer had a weight average molecular weight of 200,000. The concentration of sodium ions in the polymer was below the level of detected sensitivity (10 ppm).

Using the gel membranes prepared from the polymer, the ion conductivity, increase ratio of interfacial resistance, polarizing current value, heat resistance and flexibility were evaluated.

EXAMPLE 58

Dissolved in 80 g of the same nonaqueous solvent containing an electrolyte as used in Example 57 were 18 g of acrylonitrile, 2 g of dimethylaminoethyl acrylate, and 0.4 g of benzyldimethyl ketal as a polymerization catalyst. The obtained solution was irradiated for 10 minutes with ultraviolet rays having a peak wavelength of 360 nm and an irradiance of 12 mW/cm$^2$ at 360 nm to copolymerize the acrylonitrile and dimethylaminoethyl acrylate, giving a solution of a polymer having nitrogen-containing cationic functional group. Then the solution was placed into a vacuum container having a gauge pressure of 0.01 MPa at 50° C. to remove the unreacted acrylonitrile.

Aside from the above, a polymerizable compound solution was prepared by dissolving 10 g of polyoxyethylene dimethacrylate with a polymerization degree of 9 in 90 g of the same nonaqueous solvent containing an electrolyte as used in Example 57.

A composition solution was prepared by adding 0.3 g of 2,2'-azobis(4-methoxy-2,4-dimethylvaleronitrile) as a polymerization catalyst to a solution containing 10 g of the polymer solution and 5 g of the polymerizable compound solution. The obtained solution was treated in the same manner as in Example 57 with the exception of heating to 50° C. for 1 hour and further heating to 70° C. for 1 hour, giving a gel membrane 200 μm in thickness, i.e. the polyelectrolytic gel of the invention. Cells were assembled from the gel membrane. Then the properties were evaluated.

EXAMPLES 59 TO 64

The same procedure as in Example 57 was repeated with the exception of using 5 mole % of the following unsaturated monomers having nitrogen-containing cationic functional group and 95 mole % of acrylonitrile, by carrying out UV irradiation for polymerization and the same subsequent procedure as done in Example 57, giving a solution of a polymer having nitrogen-containing cationic functional group.

The monomers used were aminoethyl methacrylate (primary amine) in Example 59, N-monoethylaminoethyl methacrylate (secondary amine) in Example 60, N-diethylaminoethyl methacrylate (tertiary amine) in Example 61, N-trimethylaminoethyl methacrylate hydroxide (quaternary ammonium compound) in Example 62, N-aminoethyl methallylamine (a mixture of primary and secondary amines) in Example 63, and N-dimethylaminopropyl methallylamine (a mixture of secondary and tertiary amines) in Example 64.

Gel membranes were prepared and cells are constructed in the same manner as in Example 57 with the exception of using these cationic polymer solutions. The properties were evaluated in the same manner as in Example 57.

The evaluation results of Examples 57 to 64 are shown in Table 11.

TABLE 11

| | Concentration of sodium ions (ppm) | Ion conductivity (X 10$^{-3}$ S/cm, 25° C.) | Increase ratio of interfacial resistance |
|---|---|---|---|
| Ex. 57 | 10 or less | 5.7 | 1.0 time |
| Ex. 58 | 10 or less | 5.2 | 1.2 times |
| Ex. 59 | 10 or less | 3.7 | 1.7 times |
| Ex. 60 | 10 or less | 3.9 | 1.5 times |
| Ex. 61 | 10 or less | 4.3 | 1.0 time |
| Ex. 62 | 10 or less | 4.7 | 0.9 time |
| Ex. 63 | 10 or less | 4.2 | 1.2 times |
| Ex. 64 | 10 or less | 4.6 | 1.1 times |
| | Polarizing current value (mA) | Heat resistance | Flexibility |
| Ex. 57 | 11.0 | A | A |
| Ex. 58 | 10.5 | A | A |
| Ex. 59 | 6.2 | A | A |
| Ex. 60 | 7.8 | A | A |
| Ex. 61 | 9.6 | A | A |
| Ex. 62 | 10.8 | A | A |
| Ex. 63 | 9.3 | A | A |
| Ex. 64 | 9.8 | A | A |

As apparent from Table 11, no sodium ion was detected in the gel of Example 57. The gel of Example 57 showed not only a high ion conductivity, but also no increase of interfacial resistance and had a high polarizing current value. This is presumably because alkali metal ions other than lithium ions scarcely existed in the gel and the gel contained the amino group which accelerated the mobility of lithium ions.

No sodium ion was detected in the gel of Example 58. The gel of Example 58 showed a high ion conductivity, displayed no increase of interfacial resistance and had a high polarizing current value.

The gels of Examples 59 to 64 had a sodium concentration below the level of the detected sensitivity (10 ppm), showed no increase of interfacial resistance and were $3\times10^{-3}$ S/cm or higher in ion conductivity and 6 mA/cm² or more in polarizing current value, namely excellent in properties.

EXAMPLES 65 TO 74

Three kinds of cationic polymers having nitrogen-containing cationic functional group (A), (B) and (C) were prepared in the same manner as in Example 57 by employing the same device as used in Example 57 and by using 106 g of acrylonitrile and 18.5 g of diethylaminoethyl methacrylate with the exception of changing the amount of the polymerization catalyst to 2g, 0.8 g or 0.4 g. The obtained cationic polymers were washed with water, treated with an aqueous solution of lithium hydroxide, washed again with water and dried under reduced pressure in the same manner as in Example 57.

The obtained cationic polymers (A), (B) and (C) had weight average molecular weights of 50,000, 120,000 and 250,000, respectively, and no sodium ion was detected.

Each of the obtained cationic polymers was mixed with the same nonaqueous solvent containing an electrolyte as used in Example 57 in the ratio as shown below in Table 12, giving a polymer solution.

Added to each of the polymer solutions was 2 to 10 g of the polymerizable compound (polyoxyethylene dimethacrylate having a polymerization degree of 14) of Example 57 to make 100 g of a solution. A composition solution was prepared by adding di-t-butyl peroxide as a catalyst at a ratio of 3% based on the polymerizable compound. Gel membranes for evaluation of heat resistance and flexibility were prepared in the same manner as in Example 57 using the composition solution.

The heat resistance and flexibility of the gel membranes were evaluated with the results shown in Table 12.

TABLE 12

| | Kind of cationic polymer | Composition of solution (g) Cationic Polymer/electrolyte-containing nonaqueous solvent/polymerizable compound | Heat resistance | Flexibility |
|---|---|---|---|---|
| Ex. 65 | (C) | 1/97/2 | B | A |
| Ex. 66 | (C) | 2/94/4 | A | A |
| Ex. 67 | (C) | 3/92/5 | A | A |
| Ex. 68 | (C) | 5/90/5 | A | A |
| Ex. 69 | (B) | 5/85/10 | A | A |
| Ex. 70 | (B) | 10/80/10 | A | A |
| Ex. 71 | (B) | 15/80/5 | A | A |
| Ex. 72 | (A) | 20/70/10 | A | A |
| Ex. 73 | (A) | 40/55/5 | A | B |
| Ex. 74 | (A) | 50/45/5 | A | B |

As clear from Table 12, when the mixing ratio of cationic polymer/electolyte-containing nonaqueous solvent/polymerizable compound was changed, the flexibility and heat resistance of the obtained gels were changed but the gels were excellent in flexibility and heat resistance.

EXAMPLES 75 TO 79

Each of the cationic polymers (A), (B) and (C) prepared in Examples 65 to 74 was mixed with an electrolyte-containing nonaqueous solvent containing ethylene carbonate/diethyl carbonate at 2/1 mole ratio having 8% of $LiBF_4$ as an electrolyte at the ratio shown in Table 13. The obtained solution was heated to 100° C., giving a polymer solution.

Added to the obtained solution was 1 to 20 g of the same polymerizable compound as used in Example 57. A composition solution was prepared by adding di-t-butyl peroxide as a reaction catalyst at a ratio of 3% based on the polymerizable compound to 15 g of each polymer solution. Gel membranes and cells were produced in the same manner as in Example 57, and the properties were evaluated in the same manner.

The evaluation results are shown in Table 13.

TABLE 13

| | Kind of cationic polymer | Composition of solution (g) Cationic polymer/electrolyte-containing nonaqueous solvent/polymerizable compound | Heat resistance | Flexibility |
|---|---|---|---|---|
| Ex. 75 | (C) | 10/89/1 | B | A |
| Ex. 76 | (B) | 10/87/3 | A | A |
| Ex. 77 | (B) | 10/85/5 | A | A |
| Ex. 78 | (B) | 10/80/10 | A | A |
| Ex. 79 | (A) | 10/70/20 | A | B |

| | Ion conductivity (X $10^{-3}$ S/cm, 25° C.) | Polarizing current value (mA) | Increase ratio of interfacial resistance |
|---|---|---|---|
| Ex. 75 | 4.8 | 10.7 | 1.0 time |
| Ex. 76 | 4.6 | 10.3 | 1.1 times |
| Ex. 77 | 4.5 | 9.8 | 1.2 times |
| Ex. 78 | 4.3 | 9.5 | 1.2 times |
| Ex. 79 | 3.5 | 8.7 | 1.5 times |

As apparent from Table 13, the gels had excellent electrochemical properties, showed heat resistance and flexibility levels varied with the amount of the polymerizable compound but were excellent in any of these properties.

EXAMPLE 80

0.7 g of the cationic polymer (B) used in Examples 69 to 71 was mixed with 9 g of an electrolyte-containing nonaqueous solvent comprising ethylene carbonate/methylethyl carbonate at 2/1 mole ratio having 8% $LiBF_4$ as an electrolyte. The obtained solution was heated to 85° C. for 1 hour, giving a polymer solution.

Added to the obtained solution was 0.3 g of dimethoxy-polyethylene glycol (molecular weight about 2,000) to give a solution of a non-crosslinked polymer.

One gram of polyethylene glycol dimethacrylate having a polymerization degree of about 23 as a polymerizable compound was added to 4 g of the electrolyte-containing non-aqueous solvent used for dissolution of the cationic polymer (B) to give a solution of a polymerizable compound.

Using a mixture of these two solutions, gel membranes and cells were produced in the same manner as in Example 57. The properties were evaluated.

EXAMPLES 81 AND 82

16 g of acrylonitrile and 4 g of N-diethylaminoethyl methacrylate (Example 81) or acetate of N-diethylaminoethyl methacrylate (Example 82) were copolymerized in the same manner as in Example 58, giving a solution of a polymer having nitrogen-containing cationic functional group.

On the other hand, 1 g of polyoxyethylene dimethacrylate having a polymerization degree of 14 was dissolved in 9 g of the same electrolyte-containing nonagueous solvent as used in Example 57 to give a polymerizable compound solution.

Added to 10 g of the polymer solution was 5 g of the polymerizable compound solution, followed by adding 0.3 g of the same polymerization catalyst as used in Example 58. Gel membranes and cells were produced by the same procedure as in Example 58. The properties were evaluated.

EXAMPLE 83

8.5 g of a nonaqueous solvent having 8 parts of $LiBF_4$ as an electrolyte dissolved in 92 parts of a nonaqueous solvent containing ethylene carbonate/$\gamma$-butyrolactone at 2/3 mole ratio was mixed with 1.2 g of acrylonitrile, 0.3 g of N,N'-dimethylaminopropyl methacrylamide and 0.05 g of benzyldimethyl ketal as a polymerization catalyst. The obtained solution was polymerized by UV irradiation in the same manner as in Example 58, giving a solution of a polymer having nitrogen-containing cationic functional group.

Aside from the above, a polymerizable compound solution was prepared by dissolving 5 g of 1,6-hexanediol diacrylate as a polymerizable compound in 45 g of the same electrolyte-containing nonaqueous solvent as above.

Using a composition solution containing the above polymer solution, 5 g of the polymerizable compound solution and 0.025 g of 2,2'-azobis(4-methoxy-2,4-dimethylvaleronitrile), i.e. as the same polymerization catalyst as used in Example 58, a gel membrane was prepared in the same manner as in Example 58, with the exception of pouring the composition solution into a petri dish of stainless steel after placing a non-woven fabric piece of polypropylene 25 $\mu$m in thickness (weave density 7 g/m$^2$) over a lithium foil piece put on the bottom of the petri dish. Using the gel, cells were assembled for evaluation of properties in the same manner as in Example 57, and the properties were evaluated.

The evaluation results of Examples 80 to 83 are shown in Table 14.

TABLE 14

| | Ion conductivity (X $10^{-3}$ S/cm, 25° C.) | Polarizing current value (mA) | Increase ratio of interfacial resistance | Heat resistance | Flexibility |
|---|---|---|---|---|---|
| Ex. 80 | 5.5 | 11.5 | 1.0 time | A | A |
| Ex. 81 | 4.6 | 10.8 | 1.0 time | A | A |
| Ex. 82 | 3.1 | 8.2 | 1.6 times | A | A |
| Ex. 83 | 4.3 | 8.8 | 1.2 times | A | A |

As apparent from the results of Table 14, the gel of Example 80 had not only a high ion conductivity of $5.5 \times 10^{-3}$ S/cm at 25° C., but also an ion conductivity of $1.0 \times 10^{-3}$ S/cm even at −20° C. Namely it was confirmed that the gel was superior in low temperature properties.

As compared with the gel of Example 82, the gel of Example 81 showed good properties although slightly inferior in properties since the amino group of N-diethyl-aminoethyl methacrylate formed a salt with acetic acid. The reason is presumably that the acetic acid having formed a salt with the amino group was a weak acid and $CH_3COO^-$ was substituted with $BF_4^-$ of $LiBF_4$ as an electrolyte to result in release of the acetic acid having formed a salt with the amino group, rendering it unlikely to hinder the movement of $Li^+$.

The gel of Example 83 was excellent in any of properties.

EXAMPLE 84

Dissolved in 7 g of ethylene glycol having a water content of 0.5% were 0.5 g of dimethylaminoethyl acrylate and 1.5 g of polyethylene glycol monomethacrylate with a polymerization degree of about 30, followed by adding 0.04 g of 4,4'-azobis(4-cyanovaleric acid) as a polymerization catalyst. The obtained solution was heated at 80° C. for 2 hours to undergo polymerization reaction, giving a solution of a polymer having nitrogen-containing cationic functional group.

A composition solution was prepared by adding 1 g of diammonium salt of maleic acid as an electrolyte to the above-obtained polymer solution.

On the other hand, a solution of a polymerizable compound was prepared by dissolving 1 g of polyoxyethylene dimethacrylate having a polymerization degree of 14 in a solution containing 8 g of ethylene glycol and 1 g of diammonium salt of maleic acid, i.e. the same electrolyte as used above.

Two solutions were mixed together and 0.06 g of the same polymerization catalyst as used above was added. A gel membrane and a cell were produced in the same manner as in Example 57 with the exception of using a glass petri dish and heating at 60° C. for 30 minutes and at 80° C. for 1 hour without using a lithium foil piece.

The heat resistance, flexibility and electroconductivity at 25° C. of gel membranes (using a conductivity meter manufactured by Shimadzu Mfg. Co., Ltd., "Model CM-117") were measured.

The measurements confirmed that the gel membranes had heat resistance and flexibility both rated as A and showed a high ion conductivity of $12 \times 10^{-3}$ S/cm (25° C.) and a high electroconductivity required of gels for condensers as well as high heat resistance and flexibility.

What is claimed:

1. A polyelectrolytic gel in which a polymer component is swollen with a nonaqueous solvent containing an electrolyte dissolved therein, the polymer component being a crosslinked polymer having a nitrogen-containing cationic functional group and obtained by polymerizing and crosslinking 100 parts by weight of an unsaturated monomer free of nitrogen-containing cationic functional groups, 1 to 100 parts by weight of an unsaturated monomer having a nitrogen-containing cationic functional group, and 1 to 50 parts by weight of a crosslinkable monomer having, per molecule, at least two reactive functional groups selected from the group consisting of hydroxyl, carboxyl, glycidyl, vinyl, isocyanate and methylol.

2. The polyelectrolytic gel according to claim 1, wherein the nitrogen-containing cationic functional group is at least one species selected from the group consisting of free primary amino groups, secondary amino groups, tertiary amino groups, primary ammonium bases, secondary ammonium bases, tertiary ammonium bases and quaternary ammonium bases wherein the primary, secondary and tertiary ammonium bases have formed a salt with a carboxy anion, and wherein the quaternary ammonium bases have formed a salt with a hydroxy anion.

3. The polyelectrolytic gel according to claim 1, wherein the unsaturated monomer free of nitrogen-containing cationic functional group is acrylonitrile.

4. The polyelectrolytic gel according to claim 1, wherein a cation species of the electrolyte in the gel is lithium ion and the total amount of alkali metal ions other than lithium ions and alkaline earth metal ions is 500 ppm or less based on the polymer component.

5. The polyelectrolytic gel according to claim 1, wherein the electrolyte is at least one species selected from the group consisting of $LiClO_4$, $LiBF_4$, $LiPF_6$, $LiAsF_6$, $LiSCN$, $LiI$, $LiBr$, $Li_2B_{10}Cl_{10}$, $LiCF_3SO_3$ and $LiC(SO_2CF_3)_3$.

6. The polyelectrolytic gel according to claim 1, wherein the amount of the nonaqueous solvent is 100 to 5,000 parts by weight per 100 parts by weight of the polymer component.

7. The polyelectrolytic gel according to claim 1, wherein the nonaqueous solvent is an aprotic solvent.

8. The polyelectrolytic gel according to claim 7, wherein the nonaqueous solvent has a boiling point of 90° C. or higher.

9. The polyelectrolytic gel according to claim 1, wherein when heated to 80° C., the gel is neither dissolved nor brings about a phase separation into liquid phase and solid phase.

10. The polyelectrolytic gel according to claim 1, wherein the gel is in the form of a membrane having a thickness of 1 to 500 μm.

11. A polyelectrolytic gel in which a polymer component is swollen with a nonaqueous solvent containing an electrolyte dissolved therein, the polymer component being a crosslinked polymer having a nitrogen-containing cationic functional group and obtained by polymerizing 100 parts by weight of an unsaturated monomer free of nitrogen-containing cationic functional groups and 1 to 100 parts by weight of an unsaturated monomer having a nitrogen-containing cationic functional group to produce a non-crosslinked polymer having at least one reactive functional group selected from the group consisting of hydroxyl, carboxyl, glycidyl, vinyl, isocyanate and methylol, and crosslinking the resulting non-crosslinked polymer with 1 to 50 parts by weight of a crosslinking agent having, per molecule, at least two functional groups selected from the group consisting of hydroxyl, carboxyl, glycidyl, vinyl, isocyanate and methylol, the functional groups of the crosslinking agent being complementarily reactive to the reactive functional group of the non-crosslinked polymer.

12. The polyelectrolytic gel according to claim 11, wherein the unsaturated monomer free of nitrogen-containing cationic functional group comprises acrylonitrile and an unsaturated monomer having at least one reactive functional group selected from the group consisting of hydroxyl, carboxyl, glycidyl and methylol.

13. The polyelectrolytic gel according to claim 7, wherein a cation species of the electrolyte in the gel is lithium ion and the total amount of alkali metal ions other than lithium ions and alkaline earth metal ions is 500 ppm or less based on the polymer component.

14. The polyelectrolytic gel according to claim 11, wherein the electrolyte is at least one species selected from the group consisting of $LiClO_4$, $LiBF_4$, $LiPF_6$, $LiAsF_6$, LiSCN, LiI, LiBr, $Li_2B_{10}Cl_{10}$, $LiCF_3SO_3$ and $LiC(SO_2CF_3)_3$.

15. The polyelectrolytic gel according to claim 11, wherein the amount of the nonaqueous solvent is 100 to 5,000 parts by weight per 100 parts by weight of the polymer component.

16. The polyelectrolytic gel according to claim 11, wherein the nonaqueous solvent is an aprotic solvent.

17. The polyelectrolytic gel according to claim 16, wherein the nonaqueous solvent has a boiling point of 90° C. or higher.

18. The polyelectrolytic gel according to claim 11, wherein when heated to 80° C., the gel is neither dissolved nor brings about a phase separation into liquid phase and solid phase.

19. The polyelectrolytic gel according to claim 11, wherein the gel is in the form of a membrane having a thickness of 1 to 500 μm.

20. The polyelectrolytic gel according to claim 11, wherein the nitrogen-containing cationic functional group is at least one species selected from the group consisting of free primary amino groups, secondary amino groups, tertiary amino groups, primary ammonium bases, secondary ammonium bases, tertiary ammonium bases and quaternary ammonium bases wherein the primary, secondary and tertiary ammonium bases have formed a salt with a carboxy anion, and wherein the quaternary ammonium bases have formed a salt with a hydroxy anion.

21. A polyelectrolytic gel in which a polymer component is swollen with a nonaqueous solvent containing an electrolyte dissolved therein, the polymer component being a mixture of a non-crosslinked polymer having a nitrogen-containing cationic functional group and a crosslinked polymer free of nitrogen-containing cationic functional groups, wherein the crosslinked polymer free of nitrogen-containing cationic functional groups being obtained by polymerizing and crosslinking 10 to 200 parts by weight of a polymerizable compound having, per molecule, at least two crosslinkable functional groups selected from the group consisting of vinyl, glycidyl, isocyanate, hydroxyl and methylol, in the presence of 100 parts by weight of a non-crosslinked polymer having a nitrogen-containing cationic functional group.

22. The polyelectrolytic gel according to claim 21, wherein the non-crosslinked polymer having nitrogen-containing cationic functional group is obtained by polymerizing 100 parts by weight of an unsaturated monomer free of nitrogen-containing cationic functional group,and 1 to 100 parts by weight of an unsaturated monomer having nitrogen-containing cationic functional group.

23. The polyelectrolytic gel according to claim 22, wherein the unsaturated monomer free of nitrogen-containing cationic functional group is acrylonitrile.

24. The polyelectrolytic gel according to claim 21, wherein a cation species of the electrolyte in the gel is lithium ion and the total amount of alkali metal ions other than lithium ions and alkaline earth metal ions is 500 ppm or less based on the polymer component.

25. The polyelectrolytic gel according to claim 21, wherein the electrolyte is at least one species selected from the group consisting of $LiClO_4$, $LiBF_4$, $LiPF_6$, $LiAsF_6$, LiSCN, LiI, LiBr, $Li_2B_{10}Cl_{10}$, $LiCF_3SO_3$ and $LiC(SO_2CF_3)_3$.

26. The polyelectrolytic gel according to claim 21, wherein the amount of the nonaqueous solvent is 100 to 5,000 parts by weight per 100 parts by weight of the polymer component.

27. The polyelectrolytic gel according to claim 21, wherein the nonaqueous solvent is an aprotic solvent.

28. The polyelectrolytic gel according to claim 27, wherein the nonaqueous solvent has a boiling point of 90° C. or higher.

29. The polyelectrolytic gel according to claim 21, wherein when heated to 80° C., the gel is neither dissolved nor brings about a phase separation into liquid phase and solid phase.

30. The polyelectrolytic gel according to claim 21, wherein the gel is in the form of a membrane having a thickness of 1 to 500 μm.

31. The polyelectrolytic gel according to claim 21, wherein the nitrogen-containing cationic functional group is at least one species selected from the group consisting of free primary amino groups, secondary amino groups, tertiary amino groups, primary ammonium bases, secondary ammonium bases, tertiary ammonium bases and quaternary ammonium bases wherein the primary, secondary and tertiary ammonium bases have formed a salt with a carboxy anion, and wherein the quaternary ammonium bases have formed a salt with a hydroxy anion.

* * * * *

UNITED STATES PATENT AND TRADEMARK OFFICE
CERTIFICATE OF CORRECTION

PATENT NO.   : 6,420,072 B1
DATED        : July 16, 2002
INVENTOR(S)  : Maruyama et al.

It is certified that error appears in the above-identified patent and that said Letters Patent is hereby corrected as shown below:

<u>Column 33,</u>
Line 39, "claim 7" should read -- claim 11 --.

Signed and Sealed this

Twenty-fifth Day of March, 2003

JAMES E. ROGAN
*Director of the United States Patent and Trademark Office*